(12) United States Patent
Navarrete Michelini et al.

(10) Patent No.: US 11,348,005 B2
(45) Date of Patent: May 31, 2022

(54) APPARATUS, METHOD, AND COMPUTER-READABLE MEDIUM FOR IMAGE PROCESSING, AND SYSTEM FOR TRAINING A NEURAL NETWORK

(71) Applicant: BOE TECHNOLOGY GROUP CO., LTD., Beijing (CN)

(72) Inventors: Pablo Navarrete Michelini, Beijing (CN); Dan Zhu, Beijing (CN); Hanwen Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 193 days.

(21) Appl. No.: 16/614,558

(22) PCT Filed: Jun. 20, 2019

(86) PCT No.: PCT/CN2019/092113
§ 371 (c)(1),
(2) Date: Nov. 18, 2019

(87) PCT Pub. No.: WO2020/062958
PCT Pub. Date: Apr. 2, 2020

(65) Prior Publication Data
US 2021/0342976 A1    Nov. 4, 2021

(30) Foreign Application Priority Data

Sep. 30, 2018  (CN) .......................... 201811155147.2
Sep. 30, 2018  (CN) .......................... 201811155252.6
(Continued)

(51) Int. Cl.
*G06N 3/08* (2006.01)
*G06F 17/16* (2006.01)
(Continued)

(52) U.S. Cl.
CPC ............... *G06N 3/08* (2013.01); *G06F 17/16* (2013.01); *G06K 9/6232* (2013.01);
(Continued)

(58) Field of Classification Search
CPC ....... G06T 3/4076; G06T 5/50; G06T 3/4007; G06T 3/4046; G06T 5/002;
(Continued)

(56) References Cited

U.S. PATENT DOCUMENTS 6,766,067 B2  7/2004  Freeman et al.
9,727,959 B2  8/2017  Meyers et al.
(Continued)

FOREIGN PATENT DOCUMENTS

CN   101593269 A   12/2009
CN   101872472 A   10/2010
(Continued)

OTHER PUBLICATIONS

Yu, X. and Porikli, F., 2016, October. Ultra-resolving face images by discriminative generative networks. In European conference on computer vision (pp. 318-333). Springer, Cham.*
(Continued)

*Primary Examiner* — Zhitong Chen
(74) *Attorney, Agent, or Firm* — WHDA, LLP

(57) ABSTRACT

The present disclosure provides a method of training a generative adversarial network. The method includes iteratively enhancing a first noise input in a generative network to generate a first output image; iteratively enhancing a second noise input in the generative network to generate a second output image; transmitting the first output image and a second reference image to a discriminative network, the second reference image corresponding to the first reference image and having a higher resolution than the first reference image; obtaining a first score from the discriminative net-
(Continued)

work based on the second reference image, and a second score from the discriminative network based on the first output image; calculating a loss function of the generative network based on the first score and the second score; and adjusting at least one parameter of the generative network to lower the loss function of the generative network.

18 Claims, 16 Drawing Sheets

(30) Foreign Application Priority Data

Sep. 30, 2018 (CN) .......................... 201811155326.6
Sep. 30, 2018 (CN) .......................... 201811155930.9

(51) Int. Cl.
| | | |
|---|---|---|
| *G06N 3/04* | (2006.01) | |
| *G06T 3/40* | (2006.01) | |
| *G06T 5/00* | (2006.01) | |
| *G06K 9/62* | (2022.01) | |
| *G06T 5/50* | (2006.01) | |
| *G06V 10/75* | (2022.01) | |

(52) U.S. Cl.
CPC .......... *G06K 9/6257* (2013.01); *G06K 9/6268* (2013.01); *G06N 3/0454* (2013.01); *G06N 3/0481* (2013.01); *G06N 3/088* (2013.01); *G06T 3/4007* (2013.01); *G06T 3/4046* (2013.01); *G06T 3/4076* (2013.01); *G06T 5/002* (2013.01); *G06T 5/50* (2013.01); *G06V 10/751* (2022.01); *G06T 2207/20081* (2013.01); *G06T 2207/20084* (2013.01); *G06T 2207/20212* (2013.01)

(58) Field of Classification Search
CPC . G06T 2207/20081; G06T 2207/20212; G06T 2207/20084; G06N 3/0454; G06N 3/088
See application file for complete search history.

(56) References Cited

U.S. PATENT DOCUMENTS

| | | | |
|---|---|---|---|
| 9,865,036 | B1 | 1/2018 | Liu et al. |
| 2017/0365038 | A1 | 12/2017 | Denton et al. |
| 2018/0075581 | A1 | 3/2018 | Shi et al. |
| 2018/0240257 | A1 | 8/2018 | Li et al. |
| 2019/0302290 | A1* | 10/2019 | Alwon ................... G01V 1/364 |
| 2020/0034948 | A1* | 1/2020 | Park ..................... A61N 5/1039 |

FOREIGN PATENT DOCUMENTS

| | | |
|---|---|---|
| CN | 103514580 A | 1/2014 |
| CN | 105144232 A | 12/2015 |
| CN | 103903236 B | 8/2016 |
| CN | 105975931 A | 9/2016 |
| CN | 105975968 A | 9/2016 |
| CN | 107133601 A | 9/2017 |
| CN | 107154023 A | 9/2017 |
| CN | 107527044 A | 12/2017 |
| CN | 107767343 A | 3/2018 |
| CN | 107977932 A | 5/2018 |
| CN | 108052940 A | 5/2018 |
| CN | 108122197 A | 6/2018 |
| CN | 108154499 A | 6/2018 |
| CN | 108268870 A | 7/2018 |
| CN | 108334848 A | 7/2018 |
| CN | 108416428 A | 8/2018 |
| CN | 108476291 A | 8/2018 |
| CN | 108596830 A | 9/2018 |
| CN | 109360151 A | 2/2019 |
| RU | 2635883 C1 | 11/2017 |
| WO | 02089046 A1 | 11/2002 |
| WO | 2017/100903 A1 | 6/2017 |

OTHER PUBLICATIONS

Samangouei, P., Kabkab, M. and Chellappa, R., 2018. Defense-gan: Protecting classifiers against adversarial attacks using generative models. arXiv preprint arXiv:1805.06605.*
Translation of International Search Report dated Sep. 26, 2019, issued in counterpart application No. PCT/CN2019/092113. (10 pages).
Office Action dated Feb. 11, 2020, issued in counterpart CN Application No. 201811155930.9, with English translation. (20 pages).
Office Action dated Apr. 26, 2020, issued in counterpart CN Application No. 201811155326.6, with English translation (11 pages).
Office Action dated May 13, 2021, issued in counterpart RU Application No. 2020136214/28 (066777), with English Translation. (11 pages).
Office Action dated Apr. 27, 2020, issued in counterpart CN Application No. 201811155147.2, with English translation. (13 pages).
Office Action dated Oct. 27, 2020, issued in counterpart CN Application No. 201811155147.2, with English translation. (7 pages).
Gao, Yuan et al., "Medical image super-resolution algorithm based on deep residual generative adversarial network", Journal of Computer Applications, 2018, 38(9), pp. 2689-2695, with English Abstract; Cited in CN Office Action dated Apr. 27, 2020 and Apr. 26, 2020. (7 pages).
Le, Zou, "Reflection Removal with Generative Adversarial Networks", A Dissertation Submitted for the Degree of Master (South China University of Technology Guangzhou, China), with English Abstract; Cited in CN Office Action dated Feb. 11, 2020.(CNOA was cited prior IDS dated May 4, 2020) (75 pages).
Office Action dated Jun. 30, 2020, issued in counterpart CN Application No. 201811155252.6, with English Translation. (10 pages).
Wang, Wanliang et al., "Advances in generative adversarial network", Journal on Communications, Feb. 2018, vol. 39, No. 2, with English Abstract; Cited in CN Office Action dated Jun. 30, 2020. (14 pages).
Salimans, Tim et al., "Improved Techniques for Training GANs", arXiv, Dec. 2016; Cited in CN Office Action dated Jun. 30, 2020. (10 pages).
Office Action dated Sep. 28, 2021, issued in counterpart AU application No. 2019350918. (3 pages).
Office Action dated Oct. 13, 2021, issued in counterpart RU application No. 2020136214/28, with English translation. (25 pages).
Office Action dated Oct. 13, 2021, issued in counterpart RU application No. 2020136214/28, with English translation. (2 pages).
Office Action dated Oct. 29, 2021, issued in counterpart KR application No. 10-2020-7014462, with English translation. (11 pages).
Office Action dated Aug. 11, 2021, issued in counterpart IN application No. 202047021736. (6 pages).
Office Action dated Dec. 27, 2021, issued in counterpart IN application No. 202027055323. (5 pages).
Office Action dated May 21, 2021, issued in counterpart AU application No. 2019350918. (4 pages).
Michelini et al., "Multi-Scale Recursive Perception-Distortion Controllable Image Super-Resolution", ECCV, 2018, pp. 1-16, cited in KR Office Action dated Oct. 29, 2021 (16 pages).
Liu et al., "Deep Networks for Image-to-Image Translation with Mux and Demux Layers", ECCV, 2018, pp. 1-16, cited in KR Office Action dated Oct. 29, 2021. (16 pages).

* cited by examiner

APPARATUS, METHOD, AND COMPUTER-READABLE MEDIUM FOR IMAGE PROCESSING, AND SYSTEM FOR TRAINING A NEURAL NETWORK

CROSS-REFERENCE TO RELATED APPLICATIONS

This application claims benefit of the filing date of each of Chinese Patent Application No. 201811155147.2 filed on Sep. 30, 2018, Chinese Patent Application No, 201811155252.6 filed on Sep. 30, 2018, Chinese Patent Application No. 201811155326.6 filed on Sep. 30, 2018, and Chinese Patent Application No. 201811155930.9 filed on Sep. 30, 2018, the disclosure of each of which is hereby incorporated in its entirety by reference.

TECHNICAL FIELD

The present disclosure generally relates to the field of deep learning technologies, and more particularly, to image processing, and more particularly, to a system, method, and computer readable medium for image processing and for enhancing image resolution.

BACKGROUND

Deep learning technology on the basis of an artificial neural network has made great progress in such fields as image processing. An advantage of the deep learning technology lies in the solution of different technical problems using an all-purpose structure and a relatively similar system.

BRIEF SUMMARY

The present disclosure provides a method of training a generative adversarial network. The method may comprise iteratively enhancing a first noise input having a first amplitude and a first reference image in a generative network to generate a first output image; iteratively enhancing a second noise input having a second amplitude and the first reference image in the generative network to generate a second output image; transmitting the first output image and a second reference image to a discriminative network, the second reference image corresponding to the first reference image and having a higher resolution than the first reference image; obtaining a first score from the discriminative network based on the second reference image, and a second score from the discriminative network based on the first output image; calculating a loss function of the generative network basal on the first score and the second score; and adjusting at least one parameter of the generative network to lower the loss function of the generative network.

In some embodiments, the loss function of the generative network may be calculated according to equation (1):

$$\text{Loss} = \lambda_1 L_{rec}(X, Y_{n=0}) + \lambda_2 L_{per}(X, Y_{n=1}) + \lambda_3 L_{GAN}(Y_{n=1}) \quad (1).$$

In equation (1), X represents the high-resolution reference image. $Y_{n=0}$ represents the second output image. $Y_{n=1}$ represents the first output image. $L_{rec}(X, Y_{n=0})$ represents a reconstruction error between the second output image and the second reference image. $L_{per}(X, Y_{n=1})$ represents a perceptual loss between the first output image and the second reference image. $L_{GAN}(Y_{n=1})$ represents a sum of the first score and the second score. $\lambda_1, \lambda_2, \lambda_3$ each presents a predetermined weight.

In some embodiments, the reconstruction error between the second output image and the second reference image may be calculated according to equation (2):

$$L_{rec}(X, Y_{n=0}) = E[\Sigma_{l=1}^{L} \|Y_{n=0}^{l} - HR^{l}\|_1] + E[\Sigma_{l=1}^{L} \|D_{bic}^{l}(Y_{n=0}^{l}) - LR\|_1] \quad (2).$$

In equation (2), L represents the number of iterations of enhancement, and $L \geq 1$. $Y_{n=0}^{l}$ represents an image generated by the generative network microprocessor after performing one iteration based on the second noise input, and $1 \leq L$. LR represents first reference image. $D_{bic}^{l}(Y_{n=0}^{l})$ represents an image obtained by performing downsampling on the image represented by $Y_{n=0}^{l}$, the image represented by $D_{bic}^{l}(Y_{n=0}^{l})$ having the same resolution has the first reference image. $HR^{l}$ represents an image obtained by performing downsampling on the second reference image, the image represented by $HR^{l}$ having the same resolution as the image represented by $Y_{n=0}^{l}$. E[ ] represents a matrix energy calculation.

In some embodiments, the perceptual loss between the first output image and the second reference image may be calculated according to equation (3);

$$L_{per}(X, Y_{n=1}) = e[\Sigma_{l=1}^{L} L_{CX}(Y_{n=1}^{l}, HR^{l})] + E[\Sigma_{l=1}^{L} L_{CX}(D_{bic}^{l}(Y_{n=1}^{l}), LR)] \quad (3).$$

In equation (3), $Y_{n=1}^{l}$ represents an image generated by the generative network microprocessor after performing one iteration based on the first noise input. $D_{bic}^{l}(Y_{n=1}^{l})$ represents an image obtained by performing downsampling on the image represented by $Y_{n=1}^{l}$, the image represented by $D_{bic}^{l}(Y_{n=1}^{l})$ having the same resolution as the first reference image. $L_{CX}(\ )$ represents a perceptual loss function.

In some embodiments, the sum of the first score and the second score may be calculated according to equation (4):

$$L_{GAN}(Y_{n=1}) = E[\log(D(HR))] + E[\log(1 - D(Y_{n=1}))] \quad (4).$$

In equation (4), $D(Y_{n=1})$ represents the first score. D (HR) represents the second score.

In some embodiments, the method may further comprise providing the first noise input and the first reference image to the generative network to generate a third output image, the at least one parameter of the generative network having been adjusted; providing the third output image and the second reference image to the discriminative network; obtaining a third score from the discriminative network based on the second reference image, and a fourth score from the discriminative network based on the third output image; and calculating the loss function of the generative network microprocessor.

In some embodiments, the iteratively enhancing of the first noise input and the first reference image comprises generating a first feature image based on the first reference image; concatenating the first feature image with the first noise input to obtain a first composite image; and iteratively enhancing, in a finite number of iterations, the first reference image based on the first feature image and the first composite image to generate a higher-resolution image of the first reference image.

In some embodiments, the noise input for each of the finite number of iterations has the same predetermined amplitude.

In some embodiments, the method may further comprise interpolating the first reference image to obtain a first interpolated image; generating a second feature image based on the first interpolated image; downsampling the second feature image, and joining the downsampled second feature image with the first composite image to obtain a second composite image; and iteratively enhancing, in the finite number of iterations, the first reference image based on the second feature image, the first composite image, and the second composite image to obtain the higher-resolution image of the first reference image.

In some embodiments, the method may further comprise generating a first residue image based on the first composite image, the first residue image representing a degree of dissimilarity between the first composite image and the first feature image; and applying a residual correction to the first feature image based on the first residue image to obtain the higher-resolution image of the first reference image.

In some embodiments, the generating of the first residue image and the applying of the residual correction are performed at least once.

The present disclosure also provides a system for training a generative adversarial network. The system may comprise a generative adversarial network processor. The generative adversarial network processor may comprise a generative network microprocessor; and a discriminative network microprocessor coupled to the generative network microprocessor. In some embodiments, the generative adversarial network processor is configured to perform a method of training a generative adversarial network. The method may be as described above.

The present disclosure also provides a system comprising a generative network microprocessor that has been trained by a method of training a generative adversarial network. The method may be as described above.

The present disclosure also provides a generative network microprocessor, comprising an apparatus configured to perform a method of training a generative adversarial network. The method may be as described above.

In some embodiments, the apparatus may comprises: an analysis processor; a connection processor coupled to the analysis processor; and an enhancement processor coupled to the connection processor.

In some embodiments, the analysis processor may be configured to receive a reference image, and extract one or more feature from the input image to generate a feature image based on the reference image.

In some embodiments, the connection processor may be configured to receive a noise input having a predetermined amplitude, and concatenate the noise input and the feature image to generate a first composite image.

In some embodiments, the enhancement processor may be configured to iteratively enhance the reference image based on the feature image and the first composite image to generate a higher-resolution image of the reference image.

In some embodiments, when a plurality of iterations are performed, the noise input for each iteration may have the same predetermined amplitude.

In some embodiments, the enhancement processor may comprise a first upsampler, a downsampler, a residue determination processor, a second upsampler, a correction processor, and a synthesis processor, which are coupled to each other.

In some embodiments, the first upsampler may be configured to upsample the first composite image to generate an upsampled feature image.

In some embodiments, the downsampler may be configured to downsample the unsampled feature image to generate a downsampled feature image.

In some embodiments, the residue determination processor may be configured to generate a residue image from the downsampled feature image and the first composite image, the residue image representing a difference between the downsampled feature image and the first composite image.

In some embodiments, the second upsampler may be configured to upsample the residue image to generate a upsampled residue image.

In some embodiments, the correction processor may be configured to apply at least one residual correction to the upsampled feature image according to the upsampled residue image to generate a higher-resolution feature image of the reference image.

In some embodiments, the synthesis processor may be configured to synthesize a higher-resolution image of the reference image from the higher-resolution feature image.

In some embodiments, the enhancement processor may be configured to perform at least two iterations.

In some embodiments, the higher-resolution image and the higher-resolution feature image may be a reference image and a feature image for a subsequent iteration.

In some embodiments, the enhancement processor may further comprise an interpolation processor and a superposition processor, which are coupled to each other.

In some embodiments, the interpolation processor may be configured to perform interpolation on the reference image to generate an interpolated image.

In some embodiments, the superposition processor may be configured to superpose the interpolated image on an output from the synthesis processor to generate the higher-resolution image of the reference image.

In some embodiments, the first upsampler may be configured to upsample the first composite image directly.

In some embodiments, the first upsampler may be configured to generate a second composite image based on the interpolated image, and then upsample the second composite image to generate the upsampled feature image.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the present disclosure are apparent from the following detailed description taken in conjunction with the accompanying drawings in which:

Figure 1:
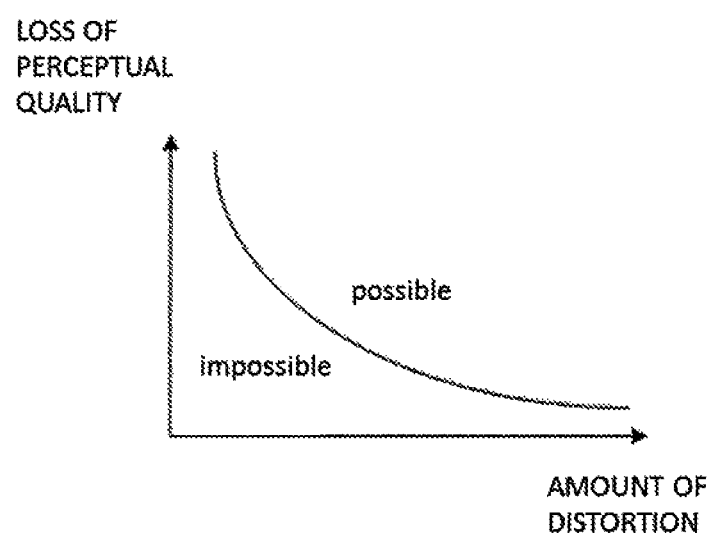
FIG. 1 shows a graph illustrating a relationship between amount of distortion and loss of perceptual quality, including an area of "possible" combinations of distortion target and perceptual quality target, and an area of "impossible" combinations of distortion target and perceptual quality target.

The various features of the drawings are not to scale as the illustrations are for clarity in facilitating one skilled in the art in understanding the invention in conjunction with the detailed description.

DETAILED DESCRIPTION

Next, the embodiments of the present disclosure will be described clearly and concretely in conjunction with the accompanying drawings, which are described briefly above. The subject matter of the present disclosure is described with specificity to meet statutory requirements. However, the description itself is not intended to limit the scope of this disclosure. Rather, the inventors contemplate that: the claimed subject matter might also be embodied in other ways, to include different steps or elements similar to the ones described in this document, in conjunction with other present or future technologies.

While the present technology has been described in connection with the embodiments of the various figures, it is to be understood that other similar embodiments may be used or modifications and additions may be made to the described embodiments for performing the same function of the present technology without deviating therefrom. Therefore, the present technology should not be limited to any single embodiment, but rather should be construed in breadth and scope in accordance with the appended claims. In addition, all other embodiments obtained by one of ordinary skill in the art based on embodiments described in this document are considered to be within the scope of this disclosure.

Deep learning technology on the basis of an artificial neural network has made great progress in such fields as image processing. Deep learning is a learning method based on characterization of data among machine learning methods. Observed values (such as an image) may be represented in various ways as a vector of intensity values of various pixels, or more abstractly, as a series of edges, an area having a particular shape, et cetera. An advantage of the deep learning technology lies in the solution of different technical problems using an all-purpose structure and a relatively similar system. The benefit of deep learning is to substitute manual acquisition of features with efficient unsupervised or semi-supervised algorithms for feature learning and hierarchical feature extraction.

Images of the natural world may be readily distinguished from images created synthetically by humans or randomly by a computer. Natural images are distinctive at least because they contain particular structure, and are highly non-random. For example, images generated synthetically and randomly by a computer rarely contain a naturalistic scene or object, image processing systems such as compression algorithms, analogue storage media, and even humans' own visual systems work on real-world images.

A convolutional neural network, or simply convolutional network, is a neural network structure that uses images as input/outputs and replaces scalar weights by filters (that is, convolutions). As an illustrative example, a convolutional network may have a simple structure with three (3) layers. This structure takes in a first number of input images in the input first layer, generates a second number of images at the hidden second layer, and outputs two images at the output layer. At each layer, convolutions followed by biases are added to the images. The result of adding several convolutions and bias then passes through an activation box, which typically corresponds to a rectifying linear unit (ReLU), a sigmoid function, a hyperbolic tangent, and the like. The convolutions and biases are fixed during operation of the network, and are obtained via a training process that involves applying a set of input/output example images and making adjustments to fit some optimization criterion that depends on applications. A typical configuration often involves tens or hundreds of convolutions in each layer. A network with a small number of layers (for example, 3 layers) is considered shallow, whereas a network with more than 5 or 10 layers is normally considered deep.

Convolutional networks are a common deep learning system, and are widely used in image processing technologies, for example, to train image recognition, image classification, and super resolution image reconstruction.

Conventional technologies for super-resolution image reconstruction reconstruct high-resolution images from their downscaled versions. This often results in the loss of image information, which in turn reduces the realness and perceptual quality of the high-resolution images.

Generative adversarial networks (GANs) are one solution for generating realistic samples of natural images. GANs may be an approach to generative modeling where two models are trained simultaneously or cross-trained.

Learning systems can be configured to adjust parameters based on a specific target, represented by a loss function. In a GAN, the loss function is replaced by another machine learning system that can independently learn a difficult task. A GAN generally includes a generative network that is pitted against a discriminative network. The generative network receives an input of a low-resolution data image, upscales the low-resolution data image, and feeds the upscaled image to the discriminative network. The discriminative network is tasked with classifying whether its input is the output of the generative network (i.e., the "fake" upscaled data image) or the actual image (i.e., the original high-resolution data image). The discriminative network outputs a score between "0" and "1", which measures the probability that its input is the upscaled image and the original image. If the discriminative network outputs a score of "0" or approaching "0", then the discriminative network has determined that the image is the output of the generative network. If the discriminative network outputs a number of "1" or approaching "1", then the discriminative network has determined that the image is the original image. This manner of pitting the generative network against the discriminative network-hence, "adversarial"—utilizes competition between the two networks to drive both networks to improve their methods until the images generated by the generative network are indistinguishable from the originals.

The discriminative network may be trained to score an input: as "real" or "fake" using data having predetermined scores. The "fake" data may be the high-resolution image generated by the generative network, and the "real" data may be a predetermined reference image. To train the discriminative network, the parameter of the discriminative network is adjusted until the discriminative network outputs a score approaching "1" whenever it receives "real" data, and a score approaching "0" whenever it receives "fake" data. To train the generative network, the parameter of the generative network is adjusted until output of the generative network receives a score as close to "1" as possible from the discriminative network.

A common analogy for GAN is that of a counterfeiter and a police. The generative network can be analogized to the counterfeiter, trying to produce fake currency and use it without detection, whereas the discriminative network can be analogized to the police, trying to detect the fake currency. Competition between the counterfeiter and the police would spur both sides to improve their methods until the counterfeits are indistinguishable from the genuine article.

Both the generative and discriminative networks are trying to optimize a different and opposing objective function, that is, the loss function, in a zero-sum game. Through "cross-training" to maximize the output by the discriminative network, the generative network improves the images it generates, and the discriminative network improves the accuracy in its distinction between the original high-resolution image and the image generated by the generative network. The generative network and the discriminative network compete to generate better images and improve the criteria to evaluate images.

There remains a need to increase the accuracy of the discriminative network in distinguishing between the original high-resolution image and the image generated by the generative network, in order to train the generative network to improve on a particular parameter. For example, there is interest in the task of generating images that are perceived to be real and uncorrupted. This can be applied to problems such as deblurring, denoising, demosaicking, compression removal, contrast enhancement, image super-resolution, et cetera, in such problems, a corrupted image is visually impaired, and a machine learning system may be designed to fix it. However, the target of recovering the original image is often impractical and leads to images that do not look real. GANs are designed to generate "real" images. A typical configuration takes a color output image and uses a machine learning system (e.g. a convolutional network) to output a single number that measures how real is the image. This system can improve perceptual quality, but today, the outputs of the adversarial system remain short of being perceived as natural images by a human viewer.

Super-resolution image reconstruction upscales a base image to generate an image of higher resolution, and more particularly, to generate a super-resolution image that improves the quality of the base image by several factors (for example, 4×). Distortion and perceptual quality are often used to evaluate the effectiveness of the super-resolution image reconstruction. Distortion measures objectively the dissimilarity between the reconstructed image and the base image. Several distortion metrics have been proposed, including mean squared error (MSE), structural similarity index (SSIM), and peak signal to noise ratio (PSNR). On the other hand, perceptual quality focuses more on creating upscaled images that look as real as natural images to human eyes.

FIG. 1 shows a graph that illustrates a relationship between distortion and perceptual quality. More particularly, FIG. 1 illustrates the conflicting roles of distortion and perceptual quality in image reconstruction. In FIG. 1, the area above the curve represents "possible" combinations of distortion target, and perceptual quality target, while the area below the curve represents "impossible" combinations of distortion target and perceptual quality target. As shown in FIG. 1, when the amount of distortion is small, the loss of perceptual quality tends to be large. In such a situation, the reconstructed image appears cohesive, but may lack details. On the other hand, when the loss of perceptual quality of small, the amount of distortion tends to be large. In such a situation, the reconstructed image tends to be rich in details. Existing technologies for super-resolution image reconstruction prefers to put the emphasis on minimizing distortion, but for some applications, viewers prefer reconstructed richly detailed reconstructed images.

Figure 2:
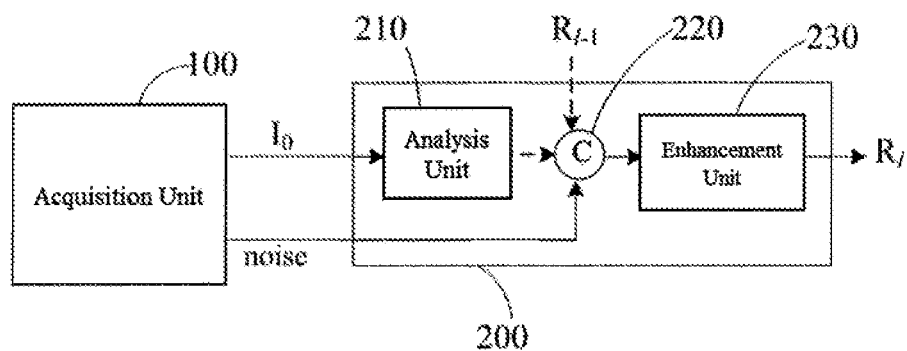
FIG. 2 shows a block diagram of a system for image processing, according to an embodiment of the present disclosure.

FIG. 2 shows a block diagram of a system for image processing, according to an embodiment of the present disclosure.

The block diagram of FIG. 2 is not intended to indicate that the system for image processing includes only the components shown in FIG. 2. The system for image processing according to the present disclosure may include any number of additional accessories and/or components known to a person of ordinary skill in the art, but not shown in FIG. 2, depending on the details of the specific implementation.

As shown in FIG. 2, the system includes an acquisition unit 100, and a generative network 200 coupled to the acquisition unit 100. The acquisition unit 100 is configured to acquire a reference image and a noise input $I_n$. The reference image may be an input image $I_0$, or as will be described later, the reference image may be an enhanced or upscaled higher-resolution image generated by an enhancement or upscaling process. There are no particular limitations on the noise input $I_n$. The noise input $I_n$ may be in the form of a noise image. The noise input $I_n$ may contain random noise.

The generative network 200 is configured to perform enhancement or upscaling on the input image $I_0$. The generative network 200 includes an analysis unit 210, a connection unit 220, and an enhancement unit 230.

The analysis unit 210 is configured to generate, based on the input image $I_0$, a corresponding feature image $R_0$. The feature image $R_0$ may be a multi-channel image that represents the different dimensions of the corresponding input image $I_0$. The feature image $R_0$ has a larger number of channels than the corresponding input image $I_0$. In some embodiments, the input image $I_0$ may have 3 channels, and the output feature image $R_0$ may have 64 channels, 128 channels, or some other arbitrary number of channels. The noise input $I_n$ may similarly be a multi-channel image.

In some embodiments, the analysis unit 210 may be implemented on a neural network architecture. Exemplary neural networks include a convolutional neural network (CNN), a residual neural network (ResNet), a dense convolutional network (DenseNet), CliqueNet, a filter bank, and the like. The analysis unit 210 may include at least one convolutional layer, and may be configured to receive, analyze, and operate on the input image $I_0$ to facilitate the generation of the feature image $R_0$. More particularly, the analysis unit 210 may be configured to generate an intermediate feature image, and then perform a convolution on the intermediate feature image to obtain the feature image $R_0$ of the input image $I_0$.

The connection unit 220 is configured to generate a first composite image by concatenating the feature image of a reference image and a noise input (for example, a noise image). In embodiments where the noise input is a noise image, and both the feature image and the noise image are multi-channel images, the first composite image generated by concatenating the feature image and the noise input will also be a multi-channel image, More particularly, concatenation involves superposing the channel image from each channel of the feature image with a channel image from one of the channels of the noise image. The number of channels in the first composite image will be the sum of the number of channels in the feature image and the number of channels in the noise image. The channel image for each channel of the first composite image will be a composite of the corresponding channel images from the feature image and the noise image.

In embodiments where multiple iterations of enhancement are performed, at the first iteration, the connection unit 220 is configured to generate a composite image by concatenating the feature image $R_0$ of the input image $I_0$ and the noise input $I_n$, for example, as shown in FIG. 2.

The enhancement unit 230 is configured to generate according to the first composite image a higher-resolution feature image based on the reference image. The resolution of the higher-resolution feature image is higher than the resolution of the reference image by a predetermined upscaling factor. The predetermined upscaling factor may be any integer greater than 1. In embodiments where the images that preceded the higher-resolution feature image are multi-channel images, the higher-resolution feature image generated by the enhancement unit 230 is also a multi-channel image. The number of channels in the higher-resolution texture image is larger than the number of channels in the reference image. In embodiments where multiple iterations of enhancement are performed, at the first iteration, the enhancement unit 230 is configured to generate a higher-resolution feature image of the input image $I_0$, for example, as shown in FIG. 2.

In some embodiments, the enhancement unit 230 may also be configured to generate a higher-resolution image based on the reference image. As a non-limiting, illustrative example, assume that the upscaling factor is A, and the resolution of the reference image is x*x. When the reference image has been upscaled by a factor of A, the resolution of the resulting image is A*x*x.

The generative network 200 is configured to iteratively enhance a reference image through upscaling. More particularly, the generative network 200 is configured to obtain an image having a target resolution by performing one or more iteration of enhancement (that is, upscaling). At the first iteration, the reference image is the input image $I_0$, and the feature image of the reference image is the feature image $R_0$ of the input image $I_0$. At subsequent iterations of enhancement, the reference image is the higher-resolution image generated during the preceding iteration, and the feature image of the reference image is the higher-resolution feature image, also generated during the preceding iteration.

As shown in FIG. 2, during the first iteration of enhancement, and the number of iterations l is greater than 1, the feature image received by the connection unit 220 is the higher-resolution feature image $R_{l-1}$ of a reference image that has undergone the $1-1^{th}$ iteration of enhancement. As a non-limiting, illustrative example, when the upscaling factor is 2, the resolution of the higher-resolution feature image after the first iteration is $2^l$ times the resolution of the starting input image. In practice, the number of iterations may be determined according to the desired target resolution and/or the upscaling factor during each iteration of enhancement.

During each iteration of enhancement, the amplitude of the noise stays the same. The amplitude of the noise corresponds to the average fluctuation in the noise. For example, in some embodiments, the noise is random noise, and the mean and variance of the noise input are $\mu$ and $\sigma$, respectively. The value of each pixel in the noise input fluctuates within the range of $\mu-\sigma$ and $\mu+\sigma$. In such embodiments, the amplitude of the noise is $\mu$. It is understood that during image processing, the images are represented as an image array, so that the "pixel value" described above represents the base unit value.

During super-resolution reconstruction, the details in the reconstructed super-resolution image (for example, hair, lines, et cetera) are often affected by the noise. It is therefore understood that during super resolution reconstruction on a generative network, the amplitude of the noise may be adjusted depending on preference and need (for example, whether the details need to be highlighted, the degree of detail, and the like), so that the reconstructed super-resolution image satisfies the desired criteria.

Figure 3:
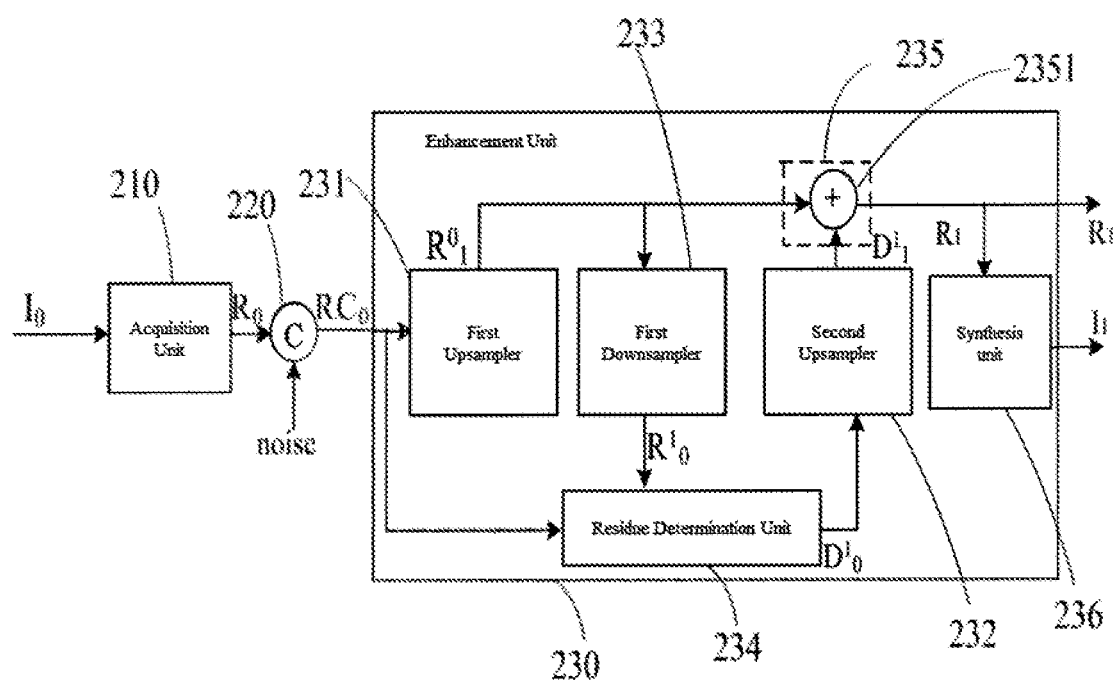
FIGS. 3-7 show block diagrams of an enhancement unit according to embodiments of the present disclosure.

FIG. 3 shows a block diagram of an enhancement unit according to an embodiment of the present disclosure.

The block diagram of FIG. 3 is not intended to indicate that the enhancement unit includes only the components shown in FIG. 3. The enhancement unit according to the present disclosure may include any number of additional accessories and/or components known to a person of ordinary skill in the art, but not shown in FIG. 3, depending on the details of the specific implementation.

In FIG. 3, the reference image received by the connection unit 220 is the starting input image $I_0$. As shown in FIG. 3, the enhancement unit 230 includes a first upsampler 231, a downsampler 233, a residue determination unit 234, a second upsampler 232, a correction unit 235, and a synthesis unit 236.

The first upsampler 231 is configured to generate a first upsampled feature image $R^0_1$ based on the first composite image $RC_0$. In some embodiments, the first upsampler 231 may be configured to implement a combination of a neural network architecture such as a convolutional neural network (CNN) and a residual neural network (ResNet), and a upsampling layer. The first upsampler 231 may implement a neural network architecture described above, which is configured to perform convolution on the first composite image $RC_0$ to generate an intermediate image. The upsampling layer is configured to perform upsampling on the intermediate image to generate the first upsampled feature image $R^0_1$. The upsampling layer may include a MuxOut layer, a strided transposed convolution layer, or a standard per channel upsampler (for example, a bicubic interpolation layer).

The downsampler 233 is configured to perform downsampling on the first upsampled feature image $R_1^0$ to generate a first downsampled feature image $R_0^1$. In some embodiments, the first upsampler 231 may be configured to implement a combination of a neural network architecture such as a convolutional neural network (CNN) and a residual neural network (ResNet), and a downsampling layer. The downsampler 233 may implement a neural network architecture, which is configured to perform downsampling on the first upsampled feature image $R_0^1$. The downsampling layer is configured to perform convolution on the downsampled image to obtain first downsampled feature image $R_0^1$. The downsampling layer may include a reverse MuxOut layer, a strided convolution layer, a maxpool layer, or a standard per channel downsampler (for example, a bicubic interpolation layer).

The residue determination unit 234 is configured to generate a residue image $D_0^1$ from the first downsampled feature image $R_0^1$ and the first composite image $RC_0$. The residue image $D_0^1$ represents the degree of dissimilarity between the first downsampled feature image $R_0^1$ and the first composite image $RC_0$.

In some embodiments, the residue determination unit 234 may be configured to perform a linear operation on the first downsampled feature image $R_0^1$ and the first composite image $R_{C0}$ to obtain the residue image $D_0^1$. The residual image represents a magnitude of difference between the first downsampled feature image $R_0^1$ and the first composite image $R_{c0}$. As a non-limiting, illustrative example, $D_0^1 = \alpha R_0^1 + \beta D_0^1$. When $\alpha=1$, $\beta=-1$, the residue image $D_0^1$ is the difference between the first downsampled feature image $R_0^1$ and the first composite image $RC_0$. The value of each pixel in the residue image $D_0^1$ represents the difference between the positionally corresponding pixels in the first downsampled feature image $R_0^1$ and the first composite image $RC_0$. The values of $\alpha$ and $\beta$ are not particularly limited. It is understood that the values of $\alpha$ and $\beta$ may be set according to preference and need. In one embodiment, $\alpha=1.1$, $\beta=-0.9$. The above values of $\alpha$ and $\beta$ are only illustrated as an exemplary example, and are not intended to limit the scope of the present disclosure. In some embodiments, a residual image can be generated by a convolutional network.

In some embodiments, the residue determination unit 234 may be configured to use a neural network to generate the residue image $D_0^1$. In other embodiments, the residue determination unit 234 may be configured to join the first downsampled feature image $R_0^1$ and the first composite image $RC_0$. Generally, the joining operation involves a weighted superposition of positionally corresponding pixels in the two images being superposed. A convolution is then performed on the joined feature image to obtain the residue image $D_0^1$. That is, the residue determination unite 234 may be use the same neural network architecture as the connection unit 220, but it is understood that the parameters of the two neural network architectures may be different.

The second upsampler 232 is configured to perform upsampling on the residue image $D_0^1$ to generate the upsampled residue image $D_1^1$. The second upsampler 232 may be configured to implement a neural network architecture such as a convolutional neural network (CNN) and a residual neural network (ResNet), and a upsampling layer, for example, as described above.

The correction unit 235 is configured to generate the higher-resolution feature image by applying residual corrections to the first upsampled feature image $R_1^0$ according to the first upsampled residue image $D_1^1$.

The first downsampled feature image $R_0^1$ is obtained after upsampling, and then downsampling, have been performed on the first composite image $RC_0$. The first downsampled feature image $R_0^1$ has the same resolution as the feature image $R_0$ of the input image $I_0$. Put differently, the first downsampled feature image $R_0^1$ is the same as an unprocessed first composite image $RC_0$. However, in practice, the upsampling of an image involves enhancing the resolution of the image through estimation. As a result, dissimilarity exists between first composite image $RC_0$ and a first downsampled feature image $R_0^1$ obtained by performing downsampling on the first upsampled feature image $R_1^0$. The differences between such a first downsampled feature image $R_0^1$ and the first composite image $RC_0$ may therefore be used to correct the first upsampled feature image $R_1^0$.

For example, as shown in FIG. 3, the correction unit 235 may apply residual corrections to the first upsampled feature image $R_1^0$ as follows. The first superposition module 2351 is configured to superpose the first upsampled residue image $D_1^1$ and the first upsampled feature image $R_1^0$, so as to correct the first upsampled feature image $R_1^0$. The image obtained after superposition is the higher resolution feature image $R_1$. Generally, the superposition operation involves the superposition of the gray levels of positionally corresponding pixels in the two images being superposed.

The synthesis unit 236 is configured to synthesize the higher-resolution image $I_1$ from the higher-resolution feature image $R_1$. As shown in FIG. 3, the synthesis unit 236 outputs an image $I_1$ that is a higher-resolution version of the input image $I_0$. The resolution of the higher-resolution image $I_1$ is the same as the resolution of the higher-resolution feature image $R_1$. The higher-resolution image $I_1$ has the same number of channels as the input image $I_0$. In some embodiments, the synthesis unit 236 may be configured to implement a convolutional neural network, and a convolution layer. The synthesis unit 236 may be configured to perform convolution on the higher resolution feature image $R_1$ using the convolutional neural network, and synthesize the higher-resolution image $I_1$ from the higher-resolution feature image $R_1$ using the convolution layer.

Figure 4:
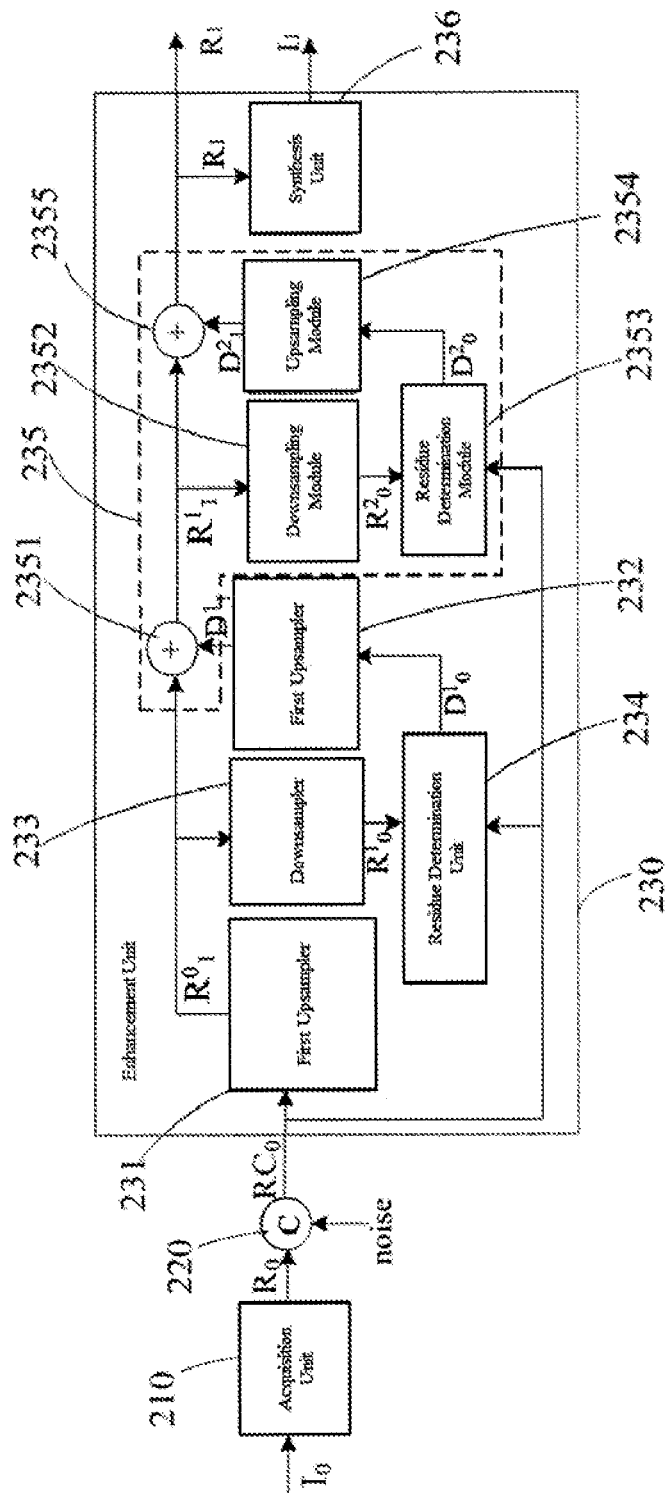

FIG. 4 shows a block diagram of an enhancement unit according to an embodiment of the present disclosure.

The block diagram of FIG. 4 is not intended to indicate that the enhancement unit includes only the components shown in FIG. 4. The enhancement unit according to the present disclosure may include any number of additional accessories and/or components known to a person of ordinary skill in the art, but not shown in FIG. 4, depending on the details of the specific implementation.

In FIG. 4, the reference image received by the connection unit 220 is the starting input image $I_0$. Similarly as shown in FIG. 3, the generative network 200 includes the analysis unit 210, the connection unit 220, and the enhancement unit 230. The enhancement unit 230 includes the first upsampler 231, the second upsampler 232, the downsampler 233, the residue determination unit 234, and the synthesis unit 236. The structures and configurations of these components are as described above.

A difference between the embodiments illustrated in FIGS. 3 and 4 is the correction unit 235.

As shown in FIG. 4, the correction unit 235 includes the first superposition module 2351, a downsampling module 2352, a residue determination module 2353, an upsampling module 2354, and a second superposition module 2355.

In FIG. 4, the first superposition module 2351 is configured to superpose the first upsampled residue image $D_1^1$ and the first upsampled feature image $R_1^0$ to obtain the second upsampled feature image $R_1^1$. The downsampling module 2352 is configured to perform downsampling on the second upsampled feature image $R_1^1$ to obtain the second downsampled feature image $R_0^2$. The residue determination module 2353 is configured to generate a residue image $D_0^2$ from the second downsampled feature image $R_0^2$ and the first composite image $RC_0$. The residue determination module 2353 may be configured to generate the residue image $D_0^2$ according to a similar process as the residue determination unit 234. The upsampling module 2354 is configured to perform upsampling on the residue image $D_0^2$ to obtain the upsampled residue image $D_1^2$. The second superposition module 2355 is configured to superpose the upsampled residue image $D_1^2$ and the second upsampled feature image $R_1^2$ to obtain the third upsampled feature image $R_1^2$, and then to generate the higher-resolution image $R_1$ from the third upsampled feature image $R_1^2$.

The first upsampler 231, the second upsampler 232, and the upsampling module 2354 may have similar structure. The downsampler 233 and the downsampling module 2352 may have similar structure. The residue determination unit 234 and the residue determination module 2353 may be configured to implement a similar convolution network, but it is understood that two convolution networks within the same system for image processing may have the same structure but different parameters.

In the embodiment illustrated in FIG. 4, the downsampler 233, the residue determination unit 234, the second upsampler 232, and the first superposition module 2351 apply a first residual correction to the first upsampled feature image $R_1^0$. The downsampling module 2352, the residue determination module 2353, the upsampling module 2354, and the second superposition unit 2355 apply a second residual correction to the first upsampled feature image $R_1^0$. In some embodiments, the correction unit 235 may include a plurality of upsampling modules, a plurality of downsampling modules, a plurality of residue determination modules, and a plurality of second superposition units, in order to perform multiple residual corrections to further improve the resolution of the reconstruction.

The generative network 200 according to the present disclosure is configured to iteratively enhance the input image $I_0$ through upscaling. More particularly, the generative network 200 is configured to obtain an image having a target resolution by performing one or more iteration of enhancement (that is, upscaling). At the first iteration, the reference image is the input image $I_0$. At subsequent iterations of enhancement, the higher-resolution feature image generated during the preceding iteration is provided to the connection module 220. During each iteration, the connection module 220 receives a noise input and a feature image that have the same resolution. In some embodiments, a predetermined amplitude may be provided to the acquisition unit 210, and then based on the predetermined amplitude, the acquisition unit 210 may generate a plurality of noise inputs having different resolutions and during each iteration, provide the connection module 220 with a noise input having the same resolution as the feature image received by the connection module 220.

Figure 5:
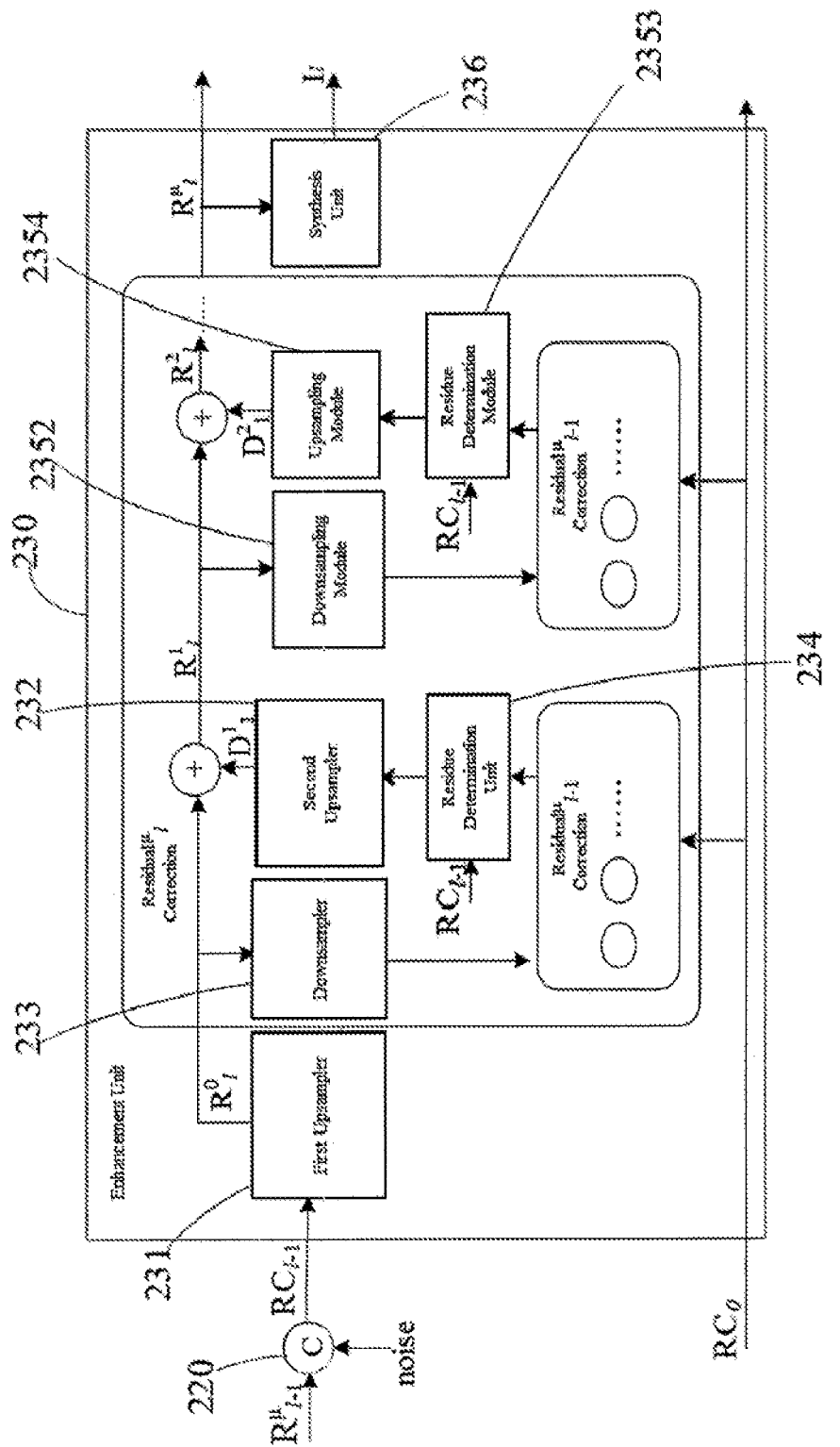

FIG. 5 shows a block diagram of an enhancement unit according to an embodiment of the present disclosure.

The block diagram of FIG. 5 is not intended to indicate that the enhancement unit includes only the components shown in FIG. 5. The enhancement unit according to the present disclosure may include any number of additional accessories and/or components known to a person of ordinary skill in the art, but not shown in FIG. 5, depending on the details of the specific implementation.

The generative network 200 according to the present disclosure is configured to perform multiple iterations of enhancement on the input image. As shown in FIG. 5, the enhancement unit 230 includes the first upsampler 231, the second upsampler 232, the downsampler 233, the residue determination unit 234, the first superposition module 2351, the downsampling module 2352, the upsampling module 2354, and the residue determination module 2353. The structures and configurations of these components are as described above for FIG. 4.

As shown in FIG. 5, the reference image received by the connection module 220 is the higher-resolution feature image $R_{l-1}^0$ generated after the l–1$^{th}$ iteration of enhancement. It is understood that the embodiment illustrated in FIG. 5 includes the analysis unit (not shown). During the first iteration of enhancement, and the number of iterations l is greater than 1, the analysis unit generates the feature image of the starting input image, and provides the feature image to the connection module.

The enhancement unit 230 may include a residual correction system configured to perform back-projection. Back-projection is the process by which residual corrections are performed on the first upsampled feature image $R_l^0$. The output from the residual correction system is the corrected upsampled feature image.

The higher-resolution image $R_{l-1}^\mu$ obtained after l–1$^{th}$ iteration of enhancement is joined to the noise input to generate the first composite image $RC_{l-1}$. The first upsampler 231 performs upsampling on the first composite image $RC_{l-1}$ to generate the first upsampled feature image $R_l^0$. The residual correction system performs multiple rounds of downsampling on the first upsampled feature image $R_l^0$ to generate a downsampled image having the same resolution as the initial input image $I_0$. Comparing the downsampled image, prepared by performing multiple rounds of downsampling on the first upsampled feature image $R_l^0$, to the first composite image $RC_0$ makes it possible to determine the residual correction to be applied to the first upsampled feature image $R_l^0$.

In FIG. 5, $R_l^\rho$ represents the higher-resolution feature image obtained after the l$^{th}$ iteration of enhancement, and during the l$^{th}$ iteration, $\rho$ rounds of residual corrections are performed on the first upsampled feature image $R^0$. As shown in FIG. 5, $R_l^1$ may be used to represent the upsampled feature image that has been subject to one round of residual correction. $R_l^2$ may be used to represent the upsampled feature image that has been subject to two rounds of residual correction, and so on. It is understood that the specific implementations, including the number of residual corrections (that is, the value of $\rho$), may be adjusted according to preference and need.

Figure 6:
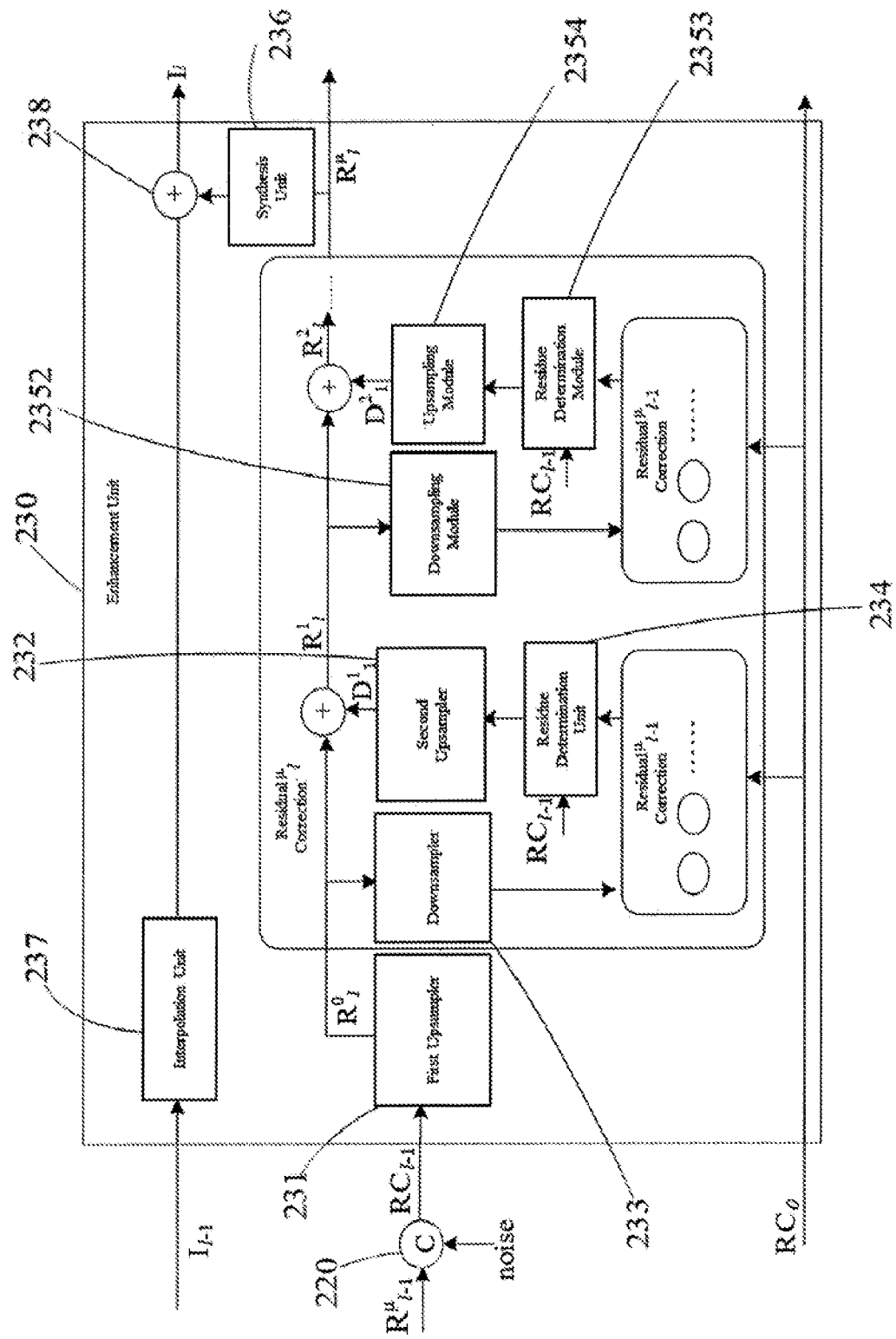

FIG. 6 shows a block diagram of an enhancement unit according to an embodiment of the present disclosure.

The block diagram of FIG. 6 is not intended to indicate that the enhancement unit includes only the components shown in FIG. 6. The enhancement unit according to the present disclosure may include any number of additional accessories and/or components known to a person of ordinary skill in the art, but not shown in FIG. 6, depending on the details of the specific implementation.

The enhancement unit 230 in FIG. 6 includes the first upsampler 231, the second upsampler 232, the downsampler 233, the residue determination unit 234, the first superposition module 2351, the downsampling module 2352, the upsampling module 2354, and the residue determination module 2353.

As shown in FIG. 6, the enhancement unit 230 includes interpolation unit 237 and superposition unit 238.

The interpolation unit 237 is configured to perform interpolation on reference image $I_{l-1}$, and to generate an interpolated image based on the reference image $I_{l-1}$. The number of channels in the interpolated image is the same as the number of channels in the reference image $I_{l-1}$. The resolution of the interpolated image is the same as the resolution of the higher-resolution feature image $R_l^\mu$. The interpolation unit 237 may be configured to perform interpolation according to any appropriate interpolation methods known to a person of ordinary skill in the art, including, but not limited to, bicubic interpolation.

The superposition unit 238 is configured to superpose the interpolated image generated by the interpolation unit 237 on the output from the synthesis unit 236, in order to generate the higher-resolution image $I_l$ of the reference image $I_{l-1}$.

A difference between the embodiments illustrated in FIGS. 5 and 6 is that, in FIG. 5, the generative network 200 directly outputs a higher-resolution version of the reference image $I_{l-1}$, whereas in FIG. 6, the generative network 200 outputs a higher-resolution version of the details image of the reference image $I_{i-1}$. The generative networks 200 illustrated in FIGS. 5 and 6 are structurally similar, but it is understood that the parameters of the two neural network architectures may be different.

Figure 7:
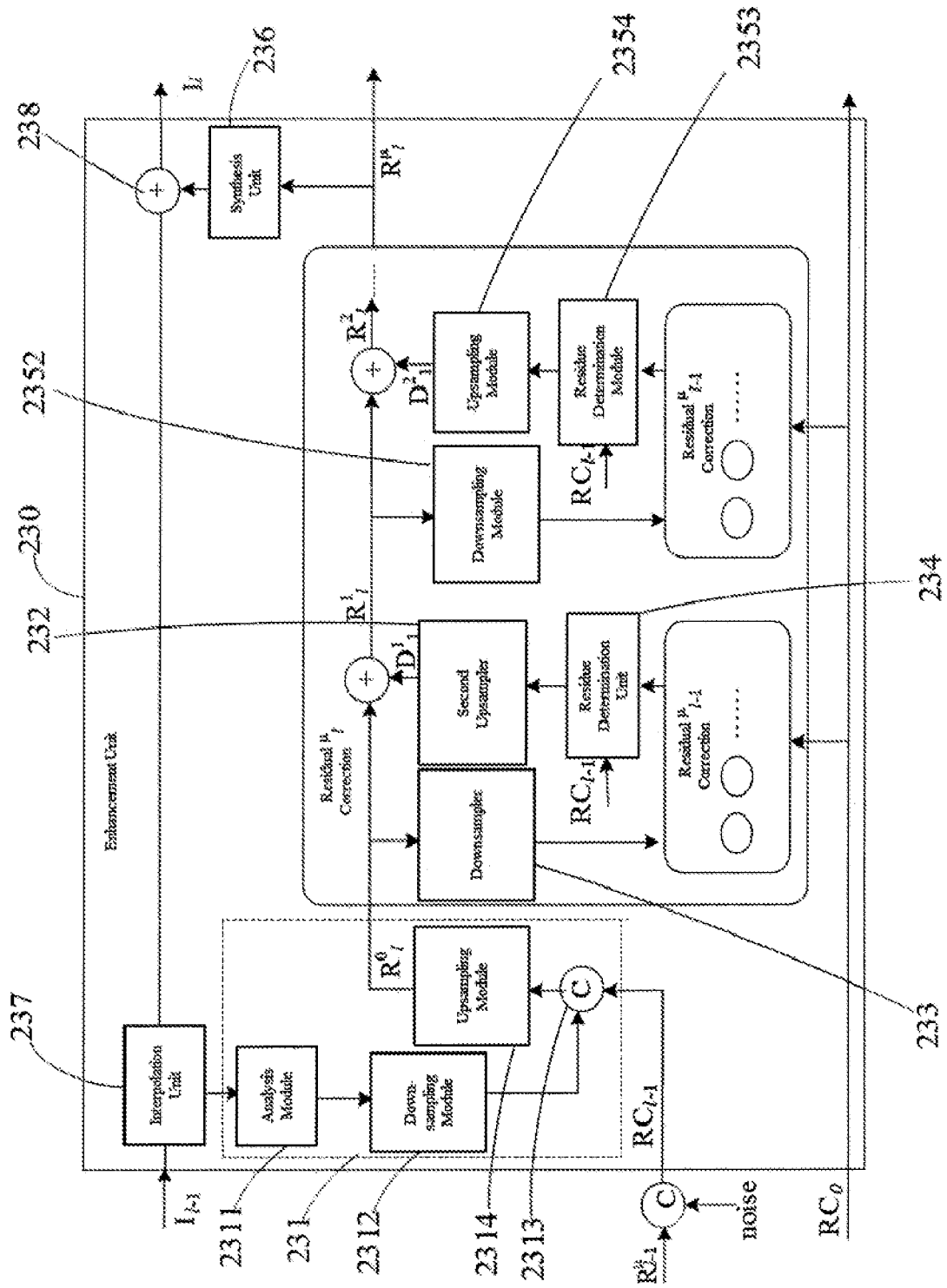

FIG. 7 shows a block diagram of an enhancement unit according to an embodiment of the present disclosure.

The block diagram of FIG. 7 is not intended to indicate that the enhancement unit includes only the components shown in FIG. 7. The enhancement unit according to the present disclosure may include any number of additional accessories and/or components known to a person of ordinary skill in the art, but not shown in FIG. 7, depending on the details of the specific implementation.

As shown in FIG. 7, the enhancement unit 200 includes the first upsampler 231, the second upsampler 232, the downsampler 233, the residue determination unit 234, the downsampling module 2352, the upsampling module 2354, and the residue determination module 2353. The structures and configurations of these components are as described above for FIG. 6.

A difference between the embodiments in FIGS. 6 and 7 is in the first upsampler 231. The first upsampler 231 in FIG. 6 is configured to perform upsampling directly on the first composite image $RC_{i-1}$ to generate the first upsampled feature image $R_i^0$. FIG. 7, the first upsampler 231 does not perform upsampling directly on the first composite image $RC_{i-1}$. It is understood that the first upsampler illustrated in FIGS. 6 and 7 may be used separately or in combination in the system for image processing according to the present disclosure.

As shown in FIG. 7, the first upsampler 231 includes an analysis module 2311, a downsampling module 2312, a connection module 2313, and an upsampling module 2314.

The analysis module 2311 of the first upsampler 231 is configured to generate a feature image of the interpolated image. The number of channels in the feature image is the same as the number of channels in the interpolated image. The resolution of the feature image is the same as the resolution of the interpolated image.

The downsampling module 2312 of the first upsampler 231 is configured to perform downsampling on the feature image of the interpolated image to generate a downsampled feature image.

The connection module 2313 of the first upsampler 231 is configured to join the downsampled feature image generated by the downsampling module 2312, with the first composite image $RC_{i-1}$, to obtain the second composite image.

The upsampling module 2314 of the first upsampler 231 is configured to perform upsampling on the second composite image to generate the first upsampled feature image $R_i^0$.

Each of the modules, units, and/or components in the system for image processing according to the present disclosure may be implemented on one or more computer systems and/or computing devices that may implement the various techniques described herein. The computing device may be in the form on a general-purpose computer, a microprocessor, in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

For example, an exemplary computing device may include a processing system, at least one computer-readable media, and at least one I/O interface, which are communicatively coupled to one another. The computing device may further include a system bus or other data and command transfer system that couples the various components to one another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system is configured to perform one or more operations using hardware, and may therefore include hardware elements that may be configured as processors, functional blocks, and the like. This may include implementation in hardware as an application specific integrated circuit or other logic device formed using one or more semiconductors. Hardware elements are not limited by the materials from which they are formed or the processing mechanisms employed therein. Processors may contain semiconductor and/or transistors (for example, electronic integrated circuits).

Computer programs (also known as programs, applications, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

I/O interfaces may be any device that allows a user to enter commands and information to the computing device, and also allow information to be presented to the user and/or other components or devices. Examples include, but are not limited to, a display device (e.g., a CRT (cathode ray tube) or LCD (liquid crystal display) monitor) for displaying information to the user, a keyboard and a pointing device (e.g., a mouse or a trackball) by which the user can provide input to the computer. Other kinds of accessories and/or devices can be used to provide for interaction with a user as well, including, for example, feedback provided to the user can be any form of sensory feedback (e.g., visual feedback, auditory feedback, or tactile feedback). Input from the user can be received in any form, including acoustic, speech, or tactile input.

The apparatuses, systems, processes, functionalities, and techniques described above can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the apparatuses, systems, processes, functionalities, and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Figure 8A:
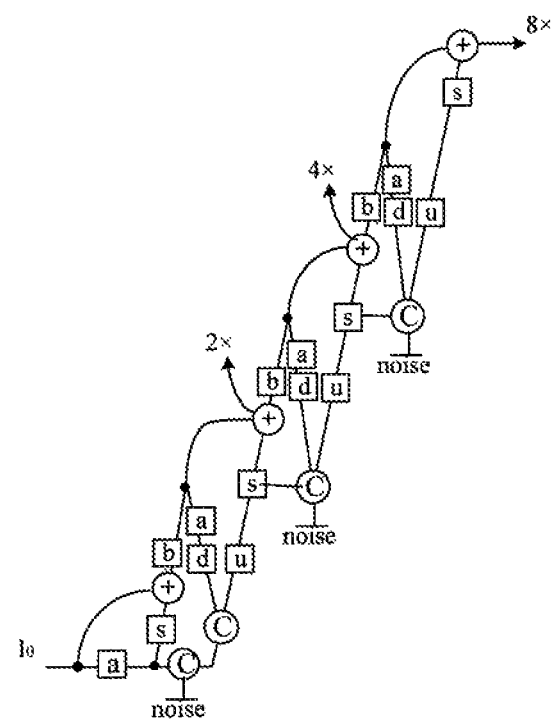
FIG. 8A shows a schematic diagram illustrating an enhancement of an input image without residual corrections.
Figure 8B:
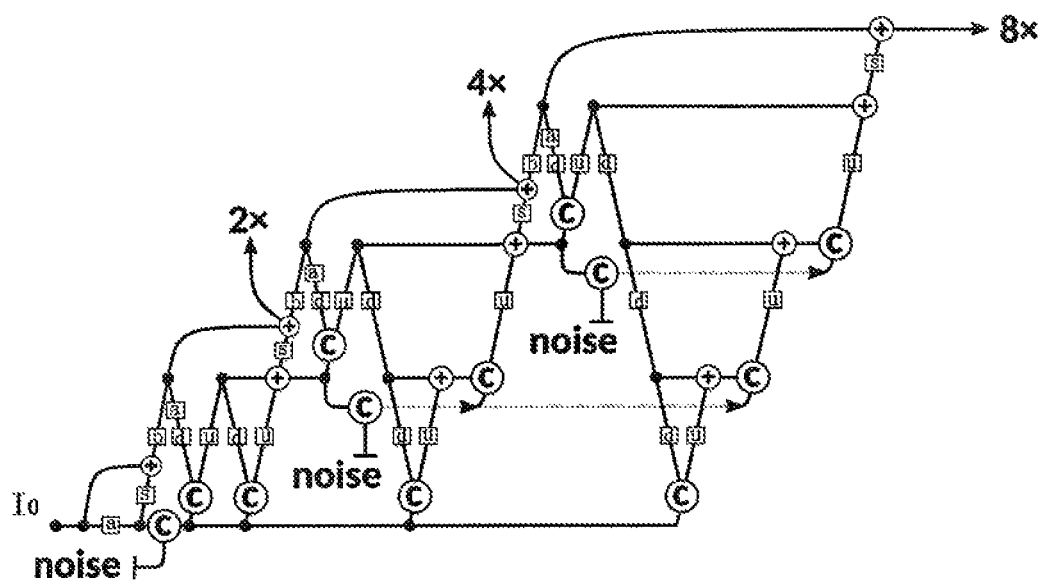
FIG. 8B shows a schematic diagram illustrating an enhancement of an input image with one residual correction.
Figure 8C:
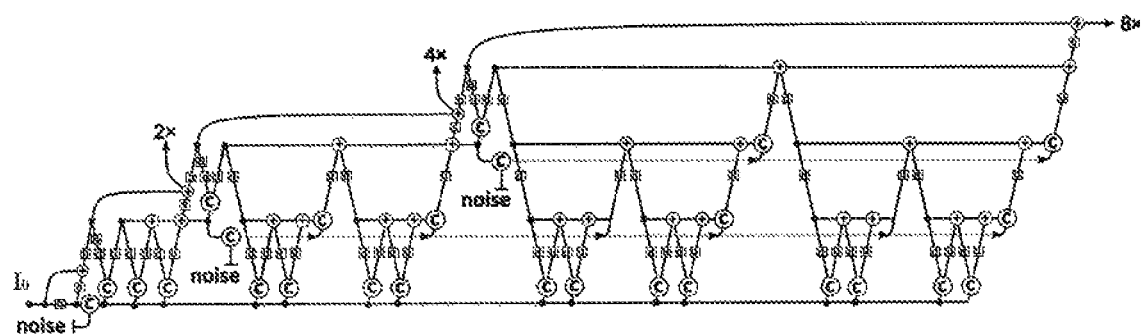
FIG. 8C shows a schematic diagram illustrating an enhancement of an input image with two residual corrections.

FIGS. 8A-8C show schematic diagrams illustrating an enhancement of an input image with different numbers of residual corrections. FIG. 8A shows a schematic diagram illustrating an enhancement of an input image without residual corrections. FIG. 8B shows a schematic diagram illustrating an enhancement of an input image with one residual correction. FIG. 8C shows a schematic diagram illustrating an enhancement of an input image with two residual corrections.

In FIGS. 8A-8C, the letter "a" represents the feature extraction operation performed by the analysis unit 210 and/or the analysis module 2311. The letter "s" represents the synthesis operation performed by the synthesis unit 236. The letter "b" represents the interpolation operation performed by the interpolation unit 237. The letter "d" represents the downsampling operation performed by the downsampler 233 and/or the downsampling module 2352, 2312. The letter "u" represents the upsampling operation performed by the second upsampler 233 and/or the upsampling module 2353, 2314. The symbol "+" represents the superposition operation performed by the first superposition module 2351 and/or the second superposition module 2355. The superposition operation involves the superposition of the gray levels of positionally corresponding pixels in the two images being superposed. The letter "c" represents the joining operation performed by the connection unit 220 and/or the connection module 2313. The joining operation involves a weighted superposition of positionally corresponding pixels in the two images being superposed. The structure and configuration of each component is as described above. Also as described above, a residue image between two images represents the degree of dissimilarity between the two images. In some embodiments, a subtraction operation may be performed to obtain the residue image. In other embodiments, the residue image may be obtained by joining two image, and then performing a transformation on the joined image. In the embodiments illustrated in FIGS. 8A-8C, the residue image is obtained through a process involving a joining operation.

In the embodiment illustrated in FIG. 8A, enhancement is performed on an input image without residual corrections. The total number of iterations of enhancement is 3, and the number of rounds (ρ) of residual correction is 0 (i.e., ρ=0).

As shown in FIG. 8A, an input image $I_0$ is input into the analysis module (a), which performs a feature extraction operation on the input image $I_0$ to obtain a feature image of the input image $I_0$. The feature image and the noise input are then joined in the connection module (c) to obtain the first composite image. The synthesis module (s) performs a synthesis operation on the feature image, and the superposition module (+) superposes the synthesized image with the input image $I_0$ to obtain a transformed input image. An interpolation operation is performed in the interpolation module (b) on the transformed input image to obtain the first interpolated image, the resolution of which has been enhanced by a factor of 2. The analysis module (a) obtains a feature image of the first interpolated image, followed by a downsampling operation in the downsampling module (d). The downsampled image is joined with the first composite image in the connection module (c). The joined image is then upsampled in the upsampling module (u) by a factor of 2 to obtain the first higher-resolution feature image. The synthesis module (s) performs a synthesis operation on the first higher-resolution feature image, and the synthesized image is superposed with the first interpolated image to obtain the first higher-resolution image.

An interpolation operation is then performed on the first higher-resolution image to obtain the second interpolated image. The first higher-resolution feature image is joined with a noise input having a corresponding resolution to obtain the second composite image. A feature extraction and a 2× downsampling are performed sequentially on the second interpolated image. The downsampled image is joined with the second composite image. The joined image is then upsampled by a factor of 2 to obtain the second higher-resolution feature image. A synthesis operation is performed on the second higher-resolution feature image, and the synthesized image is superposed with the second interpolated image to obtain the second higher-resolution image, which has a resolution that is enhanced 4× relative to the input image $I_0$.

The second higher-resolution image is then subject to the same processing as the first higher-resolution image, and the second higher-resolution feature image is subject to the same processing as the first higher-resolution feature image, in order to obtain the third higher resolution image, which has a resolution that is enhanced 8× relative to the input image $I_0$.

In the embodiment illustrated in FIG. 8B, enhancement is performed on an input image with one residual correction. The total number of iterations of enhancement is 3, and the number of rounds (ρ) of residual correction is 1 (i.e., ρ=1).

As shown in FIG. 8B, an input image $I_0$ is input into the analysis module (a), which performs a feature extraction operation on the input image $I_0$ to obtain a feature image of the input image $I_0$. The feature image is joined with a noise input having the same resolution to obtain the first composite image. The synthesis module (s) performs a synthesis operation on the feature image, and the superposition module (+) superposes the synthesized image with the input image $I_0$ to obtain a transformed input image. The interpolation module (b) interpolates the transformed input image by an interpolation factor of 2 to obtain the first interpolated image. The analysis module (a) obtains a feature image of the first interpolated image. The first interpolated image is downsampled in the downsampling module (d) by 2×. The downsampled first interpolated image is then joined with the first composite image in the connection module (c). The joined image is then upsampled in the upsampling module (u) by 2× to obtain the first upsampled feature image. The first upsampled feature image has been upsampled by 2×.

The first upsampled feature image is then downsampled, and the first residue image representing the dissimilarity between the downsampled first upsampled feature image and the first composite image is obtained. The first residue image is upsampled by 2×. The upsampled first residue image and the first upsampled feature image are superposed to obtain the first higher-resolution feature image. A synthesis operation is performed on the first higher-resolution feature image, after which the synthesized image is superposed with the first interpolated image to obtain the first higher-resolution image. The resolution of the first higher-resolution image has been enhanced 2× relative to the resolution of the input image $I_0$.

To further enhance the resolution, the first higher-resolution image may be interpolated by an interpolation factor of 2 to obtain the second interpolated image. The first higher-resolution feature image is joined with a noise input having the same resolution to obtain the second composite image. A feature extraction and downsampling are performed on the second interpolate image, and then downsampled second interpolated image is joined with the second composite image. The joined image is then upsampled to obtain a first upsampled feature image, which has been upsampled by 4×.

The first upsampled feature image is downsampled by 2× to obtain the first downsampled feature image. The first downsampled feature image is further downsampled by 2×, after which the second residue image is obtained that represents the dissimilarity between the first downsampled feature image and the first composite image. The second composite image is upsampled by 2×, and then superposed with the first downsampled feature image to determine the residue between the superposed image and the first higher-resolution feature image. The residue is upsampled by 2×, and then superposed with the first upsampled feature image (which has been upsampled by 4×) to obtain the second higher-resolution feature image. A synthesis operation is performed on the second higher-resolution feature image, followed by superposition with the second interpolated image to obtain a second higher-resolution image. The resolution of the second higher-resolution image has been enhanced 4× relative to the resolution of the input image $I_0$.

As shown in FIG. 8B, repeating the above process will generate a third higher-resolution image having a resolution that has been enhanced 8× relative to the resolution of the input image $I_0$.

In the embodiment illustrated in FIG. 8C, enhancement is performed on an input image with one residual correction. The total number of iterations of enhancement is 3, and the number of rounds (ρ) of residual correction is 2 (i.e., ρ=2).

A difference between the embodiments illustrated in FIGS. 8B and 8C is that in FIG. 8C, the first upsampled feature image is subject to multiple rounds of downsampling, and a residue between the final downsampled image and the first composite image is determined. The residue is upsampled, and superposed with the first upsampled feature image, in order to perform multiple residual corrections on the first upsampled feature image. The embodiment illustrated in FIG. 8C is described above in connection with FIG. 5.

Figure 9:
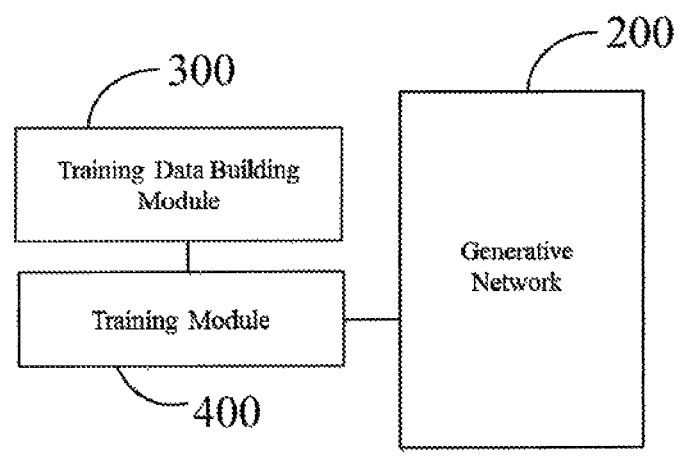
FIG. 9 shows a schematic diagram of a system for image processing, according to another embodiment of the present disclosure.

FIG. 9 shows a schematic diagram of a system for image processing, according to another embodiment of the present disclosure.

As shown in FIG. 9, the system for image processing includes the generative network 200, a training data building module 300, and a training module 400.

The training set building module 300 is configured to build data for training the generative network 200. The training data may include a plurality of high-resolution reference images, and a plurality of corresponding low-resolution reference images obtained by performing downsampling on the plurality of high-resolution reference images. The upscale factor between the high-resolution reference images and the low-resolution reference images is the same as the upscale factor between the higher-resolution image ultimately generated by the generative network and the input image (for example, $I_0$).

The training module 400 is configured to alternately train the generative network 200 and a discriminative network (not shown) until the desired training targets are met. For example, a training target may be a predetermined number of training sessions. To alternately train the generative network and the discriminative network is to alternate the training of the generative network with the training of the discriminative network, and vice versa. The discriminative network may be constructed and configured in any appropriate manner known to a person of ordinary skill in the art, so long as the discriminative network is capable of being trained with the generative network.

Figure 10:
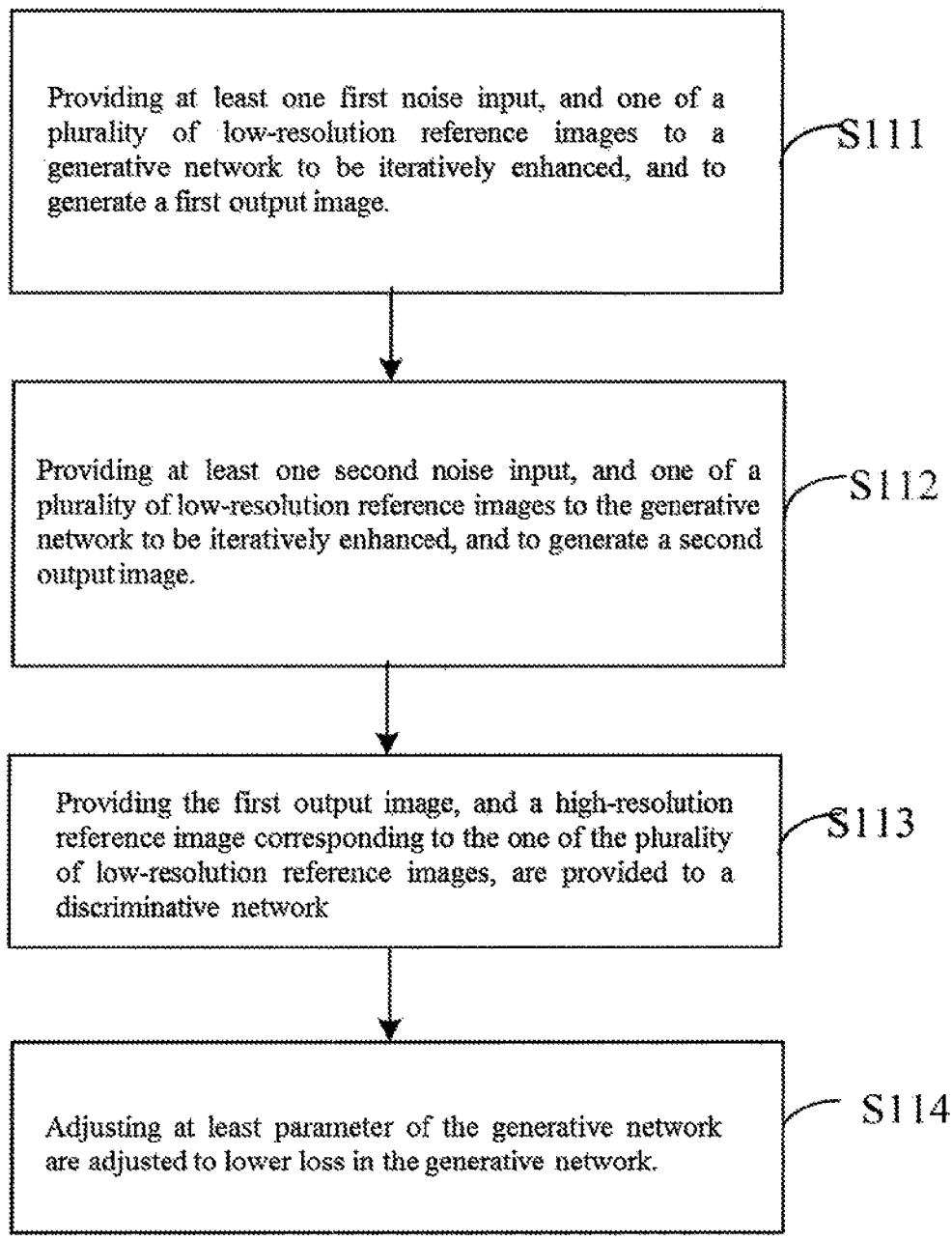
FIG. 10 shows a flow chart of a method for training a generative network according to an embodiment of the present disclosure.

FIG. 10 shows a flow chart of a method for training a generative network according to an embodiment of the present disclosure.

As shown in FIG. 10, the method includes the following steps:

In step S111, at least one first noise input corresponding to a reference noise input having a first amplitude, and one of the plurality of low-resolution reference images, are provided to the generative network to be iteratively enhanced as described above, in order to generate a first output image.

In step S112, at least one second noise input corresponding to a reference noise input having a second amplitude, and one of the plurality of low-resolution reference images, are provided to the generative network to generate a second output image through an iterative image processing as described above.

The order in which S111 and S112 are performed is not particularly limited.

The first amplitude is larger than "0", and the second amplitude is equal to "0". The number of first noise input and the number of second noise input are each the same as the number of iterations of enhancements to be performed in the iterative image processing. Further, during each iteration, the noise input has a resolution that is the same as the resolution of the feature image corresponding to the reference image. The first output image and the second output image refer to the final image generated by the iterative image processing. During the same training session, the first output image and the second output image are generated by the generative network 200 according to the same network parameters.

There are no particular limitations on the noise references, which may contain random noise. The mean and variance of the noise input are μ and σ, respectively. The value of each pixel in the noise input fluctuates within the range of ν−σ and ν+σ. In such embodiments, the amplitude of the noise is μ. In some embodiments, the mean value (μ) of the first noise input is 1, and the variance is a predetermined value (σ).

In step S113, the first output image, and the high-resolution reference image corresponding to the one of the plurality of low-resolution reference images, are provided to the discriminative network. The discriminative network analyzes and classifies the images, outputs a first score based on the first high-resolution reference image, and outputs a second score based on the first output image.

Loss in the generative network is calculated according to the following equation (1):

$$\text{Loss} = \lambda_1 L_{rec}(X, Y_{n=0}) + \lambda_2 L_{per}(X, Y_{n=1}) + \lambda_3 L_{GAN}(Y_{n=1}) \quad (1)$$

In formula (1), X represents the high-resolution reference image. $Y_{n=0}$ represents the second output image. $Y_{n=1}$ represents the first output image. $L_{rec}(X, Y_{n=0})$ represents the reconstruction error between the second output image and the high-resolution reference image. $L_{per}(X, Y_{n=1})$ represents the perceptual loss between the first output image and the high-resolution reference image. $L_{GAN}(Y_{n=1})$ represents the sum of the first score and the second score. $\lambda_1$, $\lambda_2$, $\lambda_3$ each presents a predetermined weight.

The reconstruction error $L_{rec}(X, Y_{n=0})$ is calculated according to the following equation (2):

$$L_{rec}(X,Y_{n=0})=E[\Sigma_{l=1}^{L}\|Y_{n=0}^{l}-HR^{l}\|_1]+E[\Sigma_{l=1}^{L}\|D_{bix}^{l}(Y_{n=0}^{l})-LR\|_1] \quad (2)$$

The perceptual loss $L_{per}(X, Y_{n=1})$ is calculated according to the following equation (3):

$$L_{per}(X,Y_{n=1})=E[\Sigma_{l=1}^{L}L_{CX}(Y_{n=1}^{l},HR^{l})]+E[\Sigma_{l=1}^{L}L_{CX}(D_{bix}^{l}(Y_{n=1}^{l}),LR)] \quad (3)$$

The value for $L_{GAN}(Y_{n=1})$ is calculated according to the following equation (4):

$$L_{GAN}(Y_{n=1})=E[\log(D(HR))]+E[\log(1-D(Y_{n=1}))] \quad (4)$$

In the above equations (2) to (4):

L represents the number of iterations of enhancement, and $L \geq 1$;

$Y_{n=0}^{l}$ represents the image generated by the generative network after performing one iteration of enhancement based on the second noise input, and $1 \leq l \leq L$.

LR represents the low-resolution reference image;

$D_{bic}^{l}(Y_{n=0}^{l})$ represents the image obtained by performing downsampling on the image represented by $Y_{n=0}^{l}$, and the image represented by $D_{bic}^{l}(Y_{n=0}^{l})$ has the same resolution has the low-resolution reference image;

$HR^{l}$ represents the image obtained by performing downsampling on the high-resolution reference image, and the image represented by $HR^{l}$ has the same resolution as the image represented by $Y_{n=0}^{l}$;

$Y_{n=1}^{l}$ represents the image generated by the generative network after performing one iteration of enhancement based on the first noise input;

$D_{bic}^{l}(Y_{n=1}^{l})$ represents the image obtained by performing downsampling on the image represented by $Y_{n=1}^{l}$, and the image represented by $D_{bic}^{l}(Y_{n=1}^{l})$ has the same resolution as the low-resolution reference image;

$L_{CX}()$ represents the perceptual loss function;

$D(Y_{n=1})$ represents the first score;

$D(HR)$ represents the second score; and $E[\,]$ represents matrix energy calculation.

The discriminative network includes L input terminals. L represents the number of iterations of enhancement, and $L \geq 1$. Each of the generative network's $(L-1)^{th}$ iteration of enhancement based on the first noise input generates one intermediate image, and the $L^{th}$ iteration generates the first output image. Each intermediate image is provided to the discriminative network at the same time when the first output image is provided to the discriminative network. Each of the intermediate images and the first output image are provided to the discriminative network via the corresponding input terminal.

In addition, an intermediate-resolution image having the same resolution as a corresponding intermediate image is generated by performing downsampling on the high-resolution reference image. The plurality of intermediate-resolution images are provided to the discriminative network at the same time when the high-resolution reference image is provided to the discriminative network. Each of the plurality of intermediate resolution images and the high-resolution reference image is provided to the discriminative network via the corresponding input terminal.

The discriminative network is configured to evaluate the degree of match between the high-resolution reference image and the image with the highest calculated resolution received at each input terminal. The discriminative network is configured to score each match by assigning a value from "0" to "1", if the discriminative network outputs a score of "0" or approaching "0", then the discriminative network has determined that the image having the highest calculated resolution is the output of the generative network. If the discriminative network outputs a number of "1" or approaching "1", then the discriminative network has determined that the image having the highest calculated resolution is the high-resolution reference image.

In step S114, the parameters of the generative network are adjusted to lower loss in the generative network. The loss represents the sum of the differences between the high-resolution reference image and the first and second output images, respectively.

To lower loss in the generative network is to obtain a smaller loss as calculated according to the loss function than in the previous training session for the generative network, or to establish an overall trend of decreasing loss over the course of multiple training sessions for the generative network.

Figure 11:
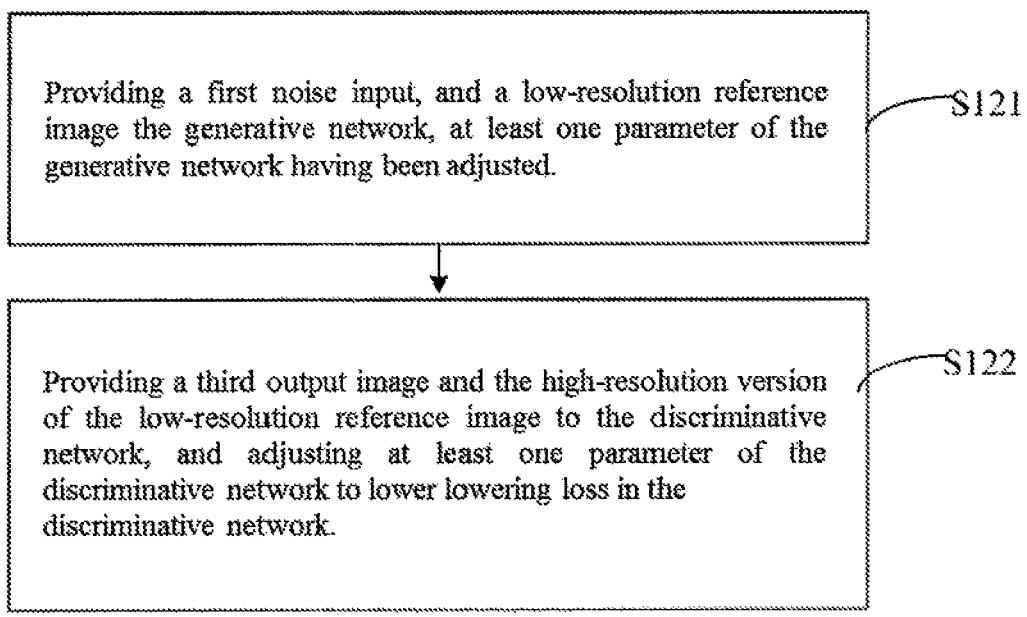
FIG. 11 shows a flow chart of a method for training a discriminative network according to an embodiment of the present disclosure.

FIG. 11 shows a flow chart of a method for training a discriminative network according to an embodiment of the present disclosure.

As shown in FIG. 11, the method includes the following steps:

In step S121, a first noise input corresponding to a reference noise input having a first amplitude, and the low-resolution reference image, are provided to the generative network, the parameters of the generative network having been adjusted. The generative network generates a third output image.

In step S122, the third output image and the high-resolution version of the low-resolution reference image are provided to the discriminative network. The parameters of the discriminative network are adjusted with an eye toward lowering the loss in the discriminative network. The discriminative network is configured to output a classification result that classifies whether the input received by the discriminative network is an output image from the generative network or the high-resolution reference image. The classification result is a value from "0" to "1". If the discriminative network outputs a score of "0" or approaching "0", then the discriminative network has determined that the input is an output image from the generative network. If the discriminative network outputs a number of "1" or approaching "1", then the discriminative network has determined that the input image is the high-resolution reference image.

The discriminative network may be constructed and configured in any appropriate manner known to a person of ordinary skill in the art, so long as the discriminative network is capable of classifying the degree of match between the image it receives as input and the reference image.

For example, in some embodiments, the discriminator may be a cascaded system. The cascaded system includes a plurality of cascade layers, each of which comprises an analysis module, a pooling module, a synthesis layer, and a sigmoid layer.

Each of the plurality of analysis modules is coupled to a corresponding one of a plurality of input terminals. The analysis modules are configured to receive, through the input terminals, the plurality of input images, to extract one or more feature from each of the plurality of input images, and to generate a plurality of features images corresponding to the plurality of input images based on the extracted one or more feature.

The analysis module may include a convolution layer and a filter. The convolution layer is configured to perform convolution on an input image. The image generated by the convolution layer is the intermediate feature image of the input image. The filter is configured to apply a filter to the intermediate feature image to obtain the feature image of the input image. The filter is configured to transform an image (for example, by extracting feature(s)). The filter may be configured as a convolutional neural network (CNN), a residual network (ResNet), a densely connected convolutional network (DenseNet), a convolutional neural network with alternately updated clique (CliqueNet), a filter bank, and the like.

Each of the plurality of analysis modules is coupled to a pooling module. The pooling modules are connected in cascade. The pooling modules are configured to receive a plurality of input images, generate a composite image by concatenating the plurality of input images, and perform downsampling on the composite image to generate a downsampled composite image. In the first layer of the cascade, the feature image from the analysis module doubles as the reference image for the corresponding pooling module. In the subsequent layers of the cascade, the reference image is the downsampled composite image generated by the pooling module in the preceding layer of the cascade.

The pooling module may include a connector, a convolution layer, and a filter. The connector is configured to concatenate the feature image generated by the analysis module and the reference image having the same resolution as the feature image, in order to generate a composite image. The convolution layer is configured to perform a downsampling operation on the composite image to obtain an intermediate downsampled feature image, which has a lower resolution than the composite image. In other words, the convolution layer in the pooling module may be a downsampling layer. The convolution layer may include a reverse MuxOut layer, a strided convolution layer, a maxpool layer, or a standard per channel downsampler (for example, a bicubic interpolation layer). The filter in the pooling module is configured to apply a filter to the intermediate downsampled feature image to obtain the downsampled feature image. The filter may be configured as a convolutional neural network (CNN), a residual network (ResNet), a densely connected convolutional network. (DenseNet), a convolutional neural network with alternately updated clique (CliqueNet), a filter bank, and the like.

The synthesis layer is configured to receive the downsampled composite image from the pooling module in the last layer of the cascaded system. The synthesis layer is configured to generate a training image based on the downsampled composite image from the last layer of the cascade of pooling modules. The synthesis layer may include a filter and at least one convolution layer. The filter is configured to apply filter to the downsampled composite image from the last layer of the cascade of pooling modules, and to obtain the intermediate training image. The filter may be configured as a convolutional neural network (CNN), a residual network (ResNet), a densely connected convolutional network (DenseNet), a convolutional neural network with alternately updated clique (CliqueNet), a filter bank, and the like. The convolution layer of the synthesis layer is configured to perform convolution on the intermediate training image to obtain the training image. The training image is then fed to the sigmoid layer, where the training image is classified against a preset standard image having the same resolution as the training image.

The sigmoid layer is configured to classify the received downsampled composite image generated by the synthesis layer, by generating a score that represents a degree of match between the received image and a preset standard image having the same resolution as the received image. The score has a value between "0" and "1". If the score is "0" or approaches "0", then the input image is determined to be the output of the generative network. If the score is "1" or approaches "1", then the image is determined to be the preset standard image.

A training process includes n number of training sessions for the discriminative network, and n number of training sessions for the generative network. During the training sessions tier the discriminative and generative networks within the same training process, the same low-resolution reference image is provided to the generative network. During different training processes, different low-resolution feature images are used.

During super-resolution reconstruction, the details in the reconstructed image having a higher resolution are affected by noise. The present disclosure provides a loss function for the generative network that takes into account not only the difference between the high-resolution reference image and the output image generated in the presence of noise, but also the difference between the high-resolution reference image and the output image generated when the noise input is set to zero. By adjusting the amplitude of the noise input entering the generative network during super-resolution reconstruction, the present disclosure makes it possible to limit the amount of loss in the reconstructed image to a point on the curve in FIG. 1. That is, given an amount of distortion, by adjusting the amplitude of the noise input entering the generative network, the present disclosure makes it possible to obtain the lowest possible perceptual loss. Conversely, given an amount of perceptual loss, by adjusting the amplitude oldie noise input entering the generative network, the present disclosure makes it possible to obtain the lowest possible distortion loss. The present disclosure thus makes it possible to provide a strategy for controlling the perception-distortion tradeoff through noise inputs that are manipulated to generate details at different scales and/or in different sizes. The present disclosure avoids conflicts between reconstruction and perceptual losses. In this way, the present disclosure provides a flexible and versatile approach to image reconstruction in which an image may be reconstructed according to different preferences and criteria.

Figure 12:
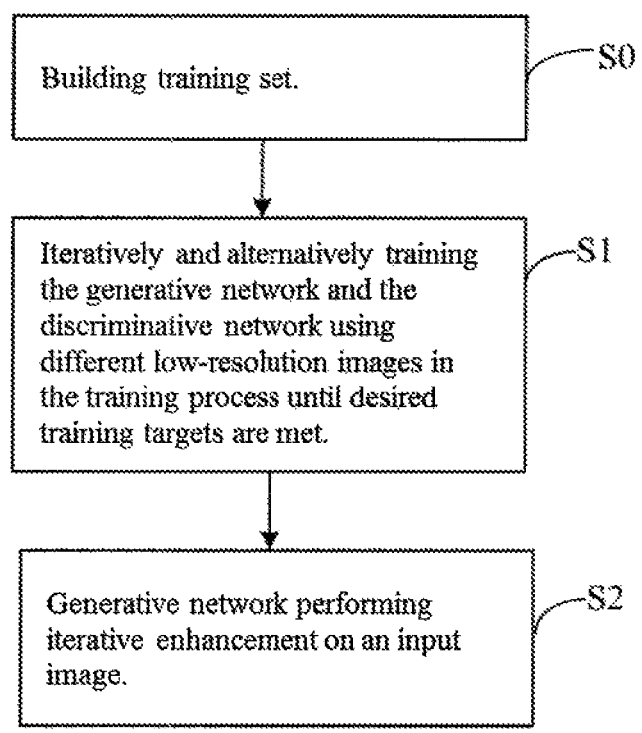
FIG. 12 shows a flow chart of a method for image processing according to an embodiment of the present disclosure.

FIG. 12 shows a flow chart of a method for image processing according to an embodiment of the present disclosure.

As shown in FIG. 12, the method includes the following steps:

In step 0 (S0), training sets are built. The training data may include a plurality of high-resolution reference images, and a plurality of corresponding low-resolution reference images obtained by performing downsampling on the plurality of high-resolution reference images. The upscale factor between the high-resolution reference images and the low-resolution reference images is the same as the upscale factor between the higher-resolution image ultimately generated by the generative network and the input image (for example, $I_0$).

In step S1, different low-resolution images are used to iteratively and alternatively train the generative network and the discriminative network in the training process until the desired training targets are met. For example, a training target may be a predetermined number of training sessions.

To alternately train the generative network and the discriminative network is to alternate the training of the generative network with the training of the discriminative network, and vice versa. The generative network may be trained as illustrated in FIG. 10, and the discriminative network may be trained as illustrated in FIG. 11.

In step S2, the generative network performs iterative enhancements on the input image. The generative network is one that has been trained according to step S1.

Figure 13:
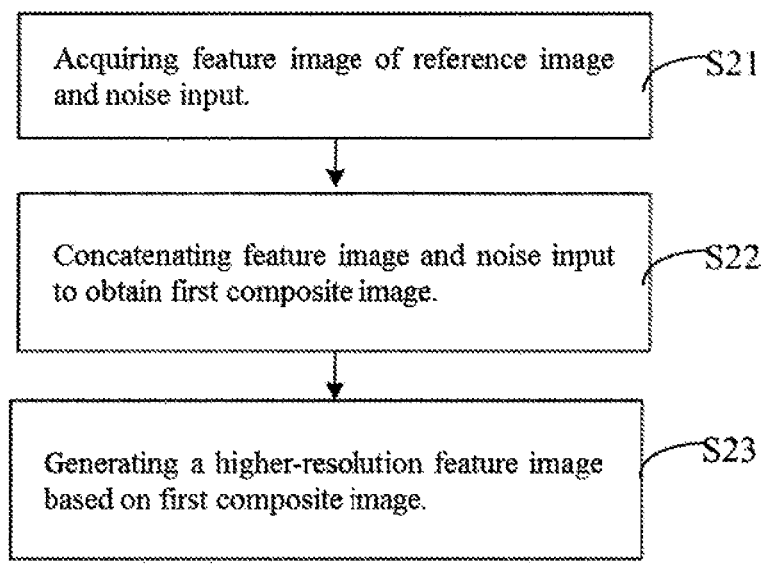
FIG. 13 shows a flow chart: of a method of iteratively enhancing an image according to an embodiment of the present disclosure.

FIG. 13 shows a flow chart of a method of iteratively enhancing an image according to an embodiment of the present disclosure.

As shown in FIG. 13, the method includes the following steps:

In step S21, the feature image of the reference image and the noise input are acquired.

In step S22, the feature image and the noise input are concatenated to obtain the first composite image.

In step S23, a higher-resolution feature image is generated based on the first composite image. The resolution of the higher-resolution feature image is higher than the resolution of the reference image.

In the first iteration of enhancement, the "feature image of the reference image" refers to the feature image of the input image. In the subsequent iterations, the "feature image of the reference image" refers to the higher-resolution feature image generated in the preceding iteration. The amplitude of the noise input is the same in each iteration.

Figure 14:
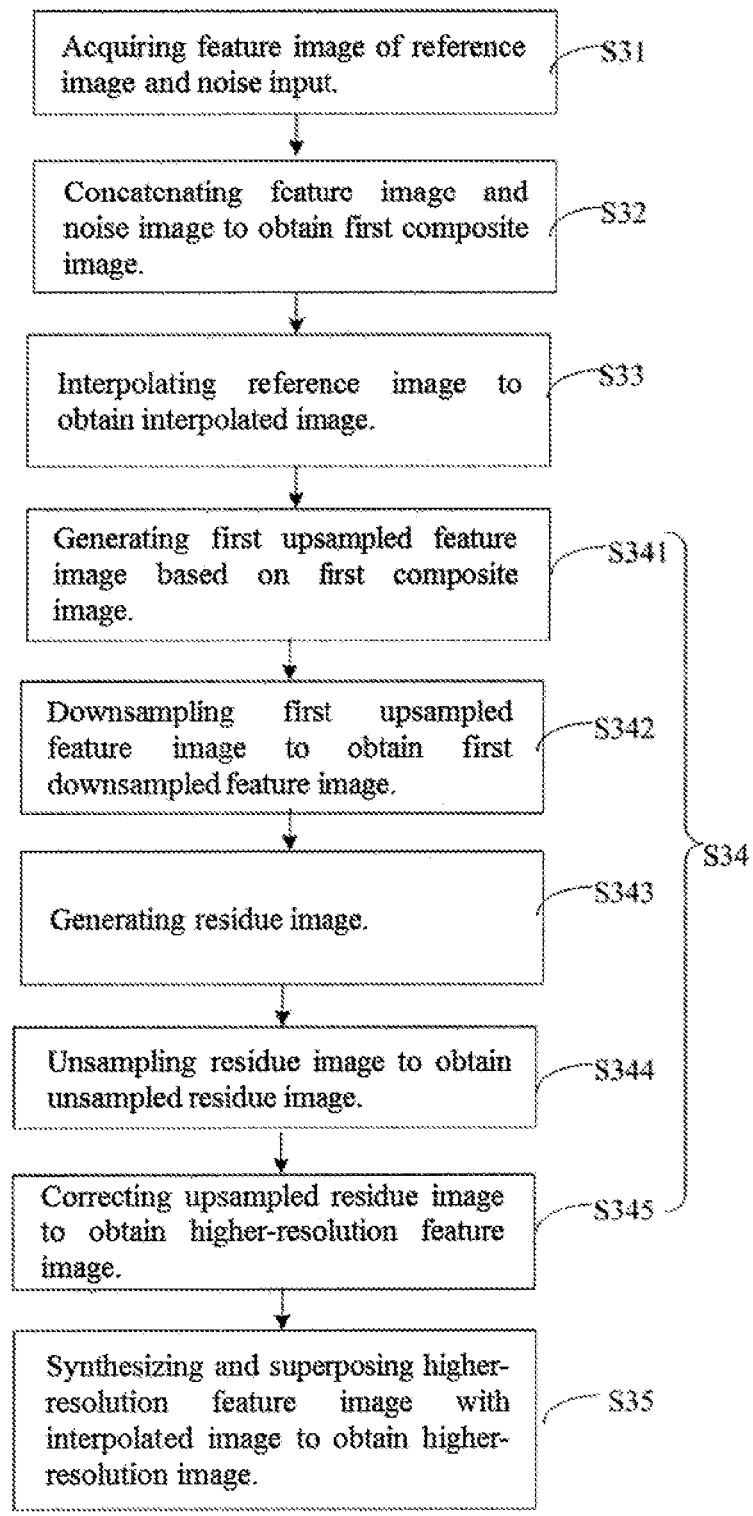
FIG. 14 shows a flow chart of a method of iteratively enhancing an image according to another embodiment of the present disclosure.

FIG. 14 shows a flow chart of a method of iteratively enhancing an image according to another embodiment of the present disclosure.

As shown in FIG. 14, the method includes the following steps:

In step S31, the feature image of the reference image and the noise input are acquired.

In step S32, the feature image and the noise input are concatenated to obtain the first composite image.

In step S33, the reference image is interpolated to obtain the interpolated image corresponding to the reference image.

In step S34, a higher resolution feature image is generated based on the first composite image. The resolution of the higher-resolution feature image is higher than the resolution of the reference image. The resolution of the interpolated image is the same as the resolution of the higher-resolution feature image.

Step S34 further includes the following steps:

In step S341, a first upsampled feature image is generated based on the first composite image. More particularly, in step S341, features are extracted from the interpolated image to obtain a feature image of the interpolated image. The feature image of the interpolated image is then downsampled, and joined, to the first composite image to obtain the second composite image. The second composite image is upsampled to obtain the first upsampled feature image.

In step S342, the first upsampled feature image is downsampled to obtain the first downsampled feature image.

In step S343, a residue image is generated that represents the degree of dissimilarity between the first downsampled feature image and the first composite image. In some embodiments, a subtraction operation may be performed on the first downsampled feature image and the first composite image to obtain the residue image. In other embodiments, the residue image may be obtained by joining the first downsampled feature image to the first composite image, and then performing a transformation on the joined image.

In step S344, the residue image is upsampled to obtain an upsampled residue image.

In step S345, the upsampled residue image is corrected to obtain a higher-resolution feature image. In some embodiments, the upsampled residue image and the first upsampled feature image may be superposed to obtain the higher-resolution feature image. In these embodiments, one correction is performed on the first upsampled feature image. In other embodiments, the correction may include: superposing the upsampled residue image and the first upsampled feature image to obtain the second upsampled feature image; downsampling the second upsampled feature image to obtain the second downsampled feature image; obtaining a residue image from the second downsampled feature image and the first composite image; upsampling the residue image; superposing the upsampled residue image with the second downsampled feature image to obtain the higher-resolution feature image. In these embodiments, two corrections are performed on the first upsampled feature image. These embodiments are also described above in connection with FIG. 4.

After step S34, in step S35, the higher-resolution feature image is synthesized and superposed with the interpolated image to obtain the higher-resolution image. The higher-resolution image is a higher-resolution version of the reference image.

In the first iteration of enhancement, the reference image is the input image. In subsequent iterations, the reference image is the higher-resolution image generated in the preceding iteration.

The methods and techniques described above may be implemented on a computing device in the form on a general-purpose computer, a microprocessor, in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

In the method for image processing according to the present disclosure, during super-resolution reconstruction of an image using a generative network, the amplitude of the noise input entering the generative network may be adjusted to achieve the desired effects (for example, whether and which details in the reconstructed image need to be highlighted, the degree of detail, and the like). In this way, the present disclosure provides a flexible and versatile approach to image reconstruction in which an image may be reconstructed according to different preferences and criteria.

The present disclosure also provides a method of enhancing an image. The method includes providing an input image and an amplitude of the noise input to a system for image processing as described, above. The system for image processing will perform L iterations of enhancement on the input image to output: a higher-resolution image. For any given input image, if noise inputs having different amplitudes are provided, the system for image processing will output different images. That is, for a given input image, if noise inputs having different amplitudes are provided, the output images will have the same content but will differ in terms of perceptual loss and/or distortion.

The present disclosure also provides a computer-readable medium that stores the instructions for performing the method for image processing as described above.

The term "computer-readable medium" may refer to any computer program product, apparatus and/or device (e.g., magnetic discs, optical disks, memory, Programmable Logic Devices (PLDs) used to provide machine instructions and/or data to a programmable processor, including a machine readable medium that receives machine instructions as a machine-readable signal. The term "machine-readable signal" refers to any signal used to provide machine instructions and/or data to a programmable processor. The computer-readable medium according to the present disclosure includes, but is not limited to, random access memory (RAM), a read-only memory (ROM), a non-volatile random access memory (NVRAM), a programmable read-only memory (PROM), erasable programmable read-only memory (EPROM), electrically erasable PROM (EEPROM), flash memory, magnetic or optical data storage, registers, disk or tape, such as compact disk (CD) or DVD (digital versatile disc) optical storage media and other non-transitory media.

Various features, implementations, and techniques are described in the present disclosure in the general context of software, hardware elements, or program modules. Generally, such modules include routines, programs, objects, elements, components, data structures, and so forth, which perform particular tasks or implement particular abstract data types. The terms "module", "functionality", "component" as used herein generally represent software, firmware, hardware, or a combination thereof. The features of the techniques described in the present disclosure are platform-independent, meaning that the techniques may be implemented on a variety of computing platforms having a variety of processors.

References in the present disclosure made to the term "some embodiment" "some embodiments," and "exemplary embodiments," "example," and "specific example," or "some examples" and the like are intended to refer that specific features and structures, materials or characteristics described in connection with the embodiment or example that are included in at least some embodiments or example of the present disclosure. The schematic expression of the terms does not necessarily refer to the same embodiment or example. Moreover, the specific features, structures, materials or characteristics described may be included in any suitable manner in any one or more embodiments or examples, in addition, for a person of ordinary skill in the art, the disclosure relates to the scope of the present disclosure, and the technical scheme is not limited to the specific combination of the technical features, and also should cover other technical schemes which are formed by combining the technical features or the equivalent features of the technical features without departing from the inventive concept. What is more, the terms "first" and "second" are for illustration purposes only and are not to be construed as indicating or implying relative importance or implied reference to the quantity of indicated technical features. Thus, features defined by the terms "first" and "second" may explicitly or implicitly include one or more of the features, in the description of the present disclosure, the meaning of "plural" is two or more unless otherwise specifically and specifically defined.

The principle and the embodiment of the present disclosures are set forth in the specification. The description of the embodiments of the present disclosure is only used to help understand the method of the present disclosure and the core idea thereof. Meanwhile, for a person of ordinary skill in the art, the disclosure relates to the scope of the disclosure, and the technical scheme is not limited to the specific combination of the technical features, and also should covered other technical schemes which are formed by combining the technical features or the equivalent features of the technical features without departing from the inventive concept. For example, technical scheme may be obtained by replacing the features described above as disclosed in this disclosure (but not limited to) with similar features.

What is claimed is:

1. A method of training a generative adversarial network, the method comprising:
   iteratively enhancing a first noise input having a first amplitude and a first reference image in a generative network to generate a first output image,
   iteratively enhancing a second noise input having a second amplitude and the first reference image in the generative network to generate a second output image,
   transmitting the first output image and a second reference image to a discriminative network, the second reference image corresponding to the first reference image and having a higher resolution than the first reference image,
   obtaining a first score from the discriminative network based on the second reference image, and a second score from the discriminative network based on the first output image,
   calculating a loss function of the generative network based on the first score and the second score, and
   adjusting at least one parameter of the generative network to lower the loss function of the generative network;
   wherein the loss function of the generative network is a sum of three terms including a first term, a second term, and a third term, the first term includes a reconstruction error between the second output image and the second reference image, the second term includes a perceptual loss between the first output image and the second reference image, the third term includes a sum of the first score and the second score, and the second reference image is a high-resolution reference image.

2. The method according to claim 1, wherein the loss function of the generative network is calculated according to equation (1):

$$\text{Loss}=\lambda_1 L_{rec}(X,Y_{n=0})+\lambda_2 L_{per}(X,Y_{n=1})+\lambda_3 L_{GAN}(Y_{n=1}) \quad (1),$$

X represents the high-resolution reference image,
$Y_{n=0}$ represents the second output image,
$Y_{n=1}$ represents the first output image,
$L_{rec}(X, Y_{n=0})$ represents the reconstruction error between the second output image and the second reference image,
$L_{per}(X, Y_{n=1})$ represents the perceptual loss between the first output image and the second reference image, $L_{GAN}(Y_{n=1})$ represents the sum of the first score and the second score, and $\lambda_1, \lambda_2, \lambda_3$ each presents a predetermined weight.

3. The method according to claim 2, wherein the reconstruction error between the second output image and the second reference image is calculated according to equation (2):

$$L_{rec}(X,Y_{n=0})=E[\Sigma_{l=1}^{L}\|Y_{n=1}^l-HR^l\|_1]+E[\Sigma_{l=1}^{L}\|D_{bic}^l(Y_{n=0}^l)-LR\|_1] \quad (2),$$

L represents the number of iterations of enhancement, and $L \geq 1$,

L represents an image generated by the generative network microprocessor after performing one iteration based on the second noise input, and $1 \leq L$, LR represents first reference image, $D_{bic}^l(Y_{n=0}^l)$ represents an image obtained by performing downsampling on the image represented by $Y_{n=0}^l$, the image represented by $D_{bic}^l(Y_{n=0}^l)$ having the same resolution has the first reference image, $HR^l$ represents an image obtained by performing downsampling on the second reference image, the image represented by $HR^l$ having the same resolution as the image represented by $Y_{n=0}$, and E[ ] represents a matrix energy calculation.

4. The method according to claim 2, wherein the perceptual loss between the first output image and the second reference image is calculated according to equation (3):

$$L_{per}(X,Y_{n=1})=E[\Sigma_{l=1}^{L}L_{CX}(Y_{n=1}^l,HR^l)]+E[\Sigma_{l=1}^{L}L_{CX}(D_{bic}^l(Y_{n=1}^l),LR)] \quad (3)$$

$Y_{n=1}^l$ represents an image generated by the generative network microprocessor after performing one iteration based on the first noise input, $D_{bic}^l(Y_{n=1}^l)$ represents an image obtained by performing downsampling on the image represented by $Y_{n=1}^l$, the image represented by $D_{bic}^l(Y_{n=1}^l)$ having the same resolution as the first reference image, and $L_{CX}(\ )$ represents a perceptual loss function.

5. The method according to claim 2, wherein the sum of the first score and the second score is calculated according to equation (4):

$$L_{GAN}(Y_{n=1})=E[\log(D(HR))]+E[\log(1-D(Y_{n=1}))] \quad (4)$$

$D(Y_{n=1})$ represents the first score, and $D(HR)$ represents the second score.

6. The method according to claim 1, further comprising:
providing the first noise input and the first reference image to the generative network to generate a third output image, the at least one parameter of the generative network having been adjusted,
providing the third output image and the second reference image to the discriminative network,
obtaining a third score from the discriminative network based on the second reference image, and a fourth score from the discriminative network based on the third output image, and
calculating the loss function of the generative network microprocessor.

7. The method according to claim 1, wherein the iteratively enhancing of the first noise input and the first reference image comprises:
generating a first feature image based on the first reference image,
concatenating the first feature image with the first noise input to obtain a first composite image, and
iteratively enhancing, in a finite number of iterations, the first reference image based on the first feature image and the first composite image to generate a higher-resolution image of the first reference image,
wherein the noise input for each of the finite number of iterations has the same predetermined amplitude.

8. The method according to claim 7, further comprising:
interpolating the first reference image to obtain a first interpolated image,
generating a second feature image based on the first interpolated image,
downsampling the second feature image, and joining the downsampled second feature image with the first composite image to obtain a second composite image, and
iteratively enhancing, in the finite number of iterations, the first reference image based on the second feature image, the first composite image, and the second composite image to obtain the higher-resolution image of the first reference image.

9. The method according to claim 7, further comprising:
generating a first residue image based on the first composite image, the first residue image representing a degree of dissimilarity between the first composite image and the first feature image, and
applying a residual correction to the first feature image based on the first residue image to obtain the higher-resolution image of the first reference image.

10. The method according to claim 9, wherein the generating of the first residue image and the applying of the residual correction are performed at least once.

11. A generative network microprocessor, comprising an apparatus configured to perform the method according to claim 7.

12. The generative network microprocessor according to claim 11, wherein the apparatus comprises:
an analysis processor,
a connection processor coupled to the analysis processor, and
an enhancement processor coupled to the connection processor,
wherein:
the analysis processor is configured to receive a reference image, and extract one or more feature from the input image to generate a feature image based on the reference image,
the connection processor is configured to receive a noise input having a predetermined amplitude, and concatenate the noise input and the feature image to generate a first composite image,
the enhancement processor is configured to iteratively enhance the reference image based on the feature image and the first composite image to generate a higher-resolution image of the reference image,
when a plurality of iterations are performed, the noise input for each iteration has the same predetermined amplitude.

13. The generative network microprocessor according to claim 12, wherein:
the enhancement processor comprises a first upsampler, a downsampler, a residue determination processor, a second upsampler, a correction processor, and a synthesis processor, which are coupled to each other,
the first upsampler is configured to upsample the first composite image to generate an upsampled feature image,
the downsampler is configured to downsample the unsampled feature image to generate a downsampled feature image, the residue determination processor is configured to generate a residue image from the downsampled feature image and the first composite image, the residue image representing a difference between the downsampled feature image and the first composite image, the second upsampler is configured to upsample the residue image to generate a upsampled residue image, the correction processor is configured to apply at least one residual correction to the upsampled feature image according to the upsampled residue image to generate a higher-resolution feature image of the reference image, the synthesis processor is configured to synthesize a higher-resolution image of the reference image from the higher-resolution feature image, the enhancement processor is configured to perform at least two iterations, and the higher-resolution image and the higher-resolution feature image are a reference image and a feature image for a subsequent iteration.

14. The generative network microprocessor according to claim 13, wherein:

the enhancement processor further comprises an interpolation processor and a superposition processor, which are coupled to each other, the interpolation processor is configured to perform interpolation on the reference image to generate an interpolated image, and the superposition processor is configured to superpose the interpolated image on an output from the synthesis processor to generate the higher-resolution image of the reference image.

15. The generative network microprocessor according to claim 13, wherein:

the first upsampler is configured to upsample the first composite image directly.

16. The generative network microprocessor according to claim 15, wherein: the first upsampler is configured to generate a second composite image based on the interpolated image, and then upsample the second composite image to generate the upsampled feature image.

17. A system for training a generative adversarial network, comprising:

a generative adversarial network processor, comprising a generative network microprocessor, and a discriminative network microprocessor coupled to the generative network microprocessor, wherein the generative adversarial network processor is configured to perform the method according to claim 1.

18. A system, comprising a generative network microprocessor that has been trained by the method according to claim 1.

* * * * *